United States Patent
Fields et al.

(10) Patent No.: US 10,748,446 B1
(45) Date of Patent: *Aug. 18, 2020

(54) REAL-TIME DRIVER OBSERVATION AND PROGRESS MONITORING

(71) Applicant: STATE FARM MUTUAL AUTOMOBILE INSURANCE COMPANY, Bloomington, IL (US)

(72) Inventors: Brian Mark Fields, Normal, IL (US); Steve Roberson, Normal, IL (US); Abhishek Harish, Champaign, IL (US); Hyunji Lim, Champaign, IL (US); Matthew James Waughtel, Cuba, IL (US); Bryan Allen Plummer, Urbana, IL (US); Parker Andrew Brown, Mundelein, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/902,357

(22) Filed: Feb. 22, 2018

Related U.S. Application Data

(63) Continuation of application No. 15/410,445, filed on Jan. 19, 2017, now Pat. No. 9,959,780, which is a
(Continued)

(51) Int. Cl.
*G09B 19/16* (2006.01)
*B60K 35/00* (2006.01)
(Continued)

(52) U.S. Cl.
CPC ............ *G09B 19/167* (2013.01); *B60K 35/00* (2013.01); *G09B 5/00* (2013.01); *B60K 2370/11* (2019.05);
(Continued)

(58) Field of Classification Search
CPC ........ G09B 19/167; G09B 5/00; B60K 35/00; B60K 2350/1076; B60K 2350/1004;
(Continued)

(56) References Cited

U.S. PATENT DOCUMENTS 6,636,790 B1   10/2003   Lightner et al.
7,155,321 B2   12/2006   Bromley et al.
(Continued)

OTHER PUBLICATIONS

U.S. Appl. No. 14/494,251, Final Office Action, dated May 12, 2015.
(Continued)

*Primary Examiner* — Yuen Wong
(74) *Attorney, Agent, or Firm* — Marshall, Gerstein & Borun LLP

(57) ABSTRACT

In an embodiment, movement-data is gathered with one or more sensors (e.g., accelerometers, GPS receivers, etc.) during a driver's driving session. A score may be calculated for the driving session, and the driver's progress is evaluated by a driver-evaluation system. A driving session report or graphical user-interface (GUI) is generated with a computer processor and displayed at a display device. The displayed report or GUI includes a graphic representing the driver's progress relative to historical data.

18 Claims, 11 Drawing Sheets

Related U.S. Application Data continuation of application No. 14/703,482, filed on May 4, 2015, now Pat. No. 9,586,591.

(51) Int. Cl.
  *G09B 5/00* (2006.01)
  *G09G 5/00* (2006.01)

(52) U.S. Cl.
  CPC .... *B60K 2370/143* (2019.05); *B60K 2370/16* (2019.05); *B60K 2370/334* (2019.05); *B60K 2370/589* (2019.05); *G09G 5/003* (2013.01); *G09G 2370/16* (2013.01); *G09G 2380/10* (2013.01)

(58) Field of Classification Search
  CPC ...... B60K 2350/2052; B60K 2350/357; B60K 2350/1024; G09G 5/003; G09G 2380/10; G09G 2370/16
  See application file for complete search history.

(56) References Cited

U.S. PATENT DOCUMENTS

| | | | |
|---|---|---|---|
| 7,835,691 B2 | 11/2010 | Groskreutz et al. | |
| 7,937,278 B1 | 5/2011 | Cripe et al. | |
| 8,140,358 B1 | 3/2012 | Ling et al. | |
| 8,306,731 B2 | 11/2012 | Waggaman, III | |
| 8,463,488 B1 | 6/2013 | Hart | |
| 8,554,468 B1 | 10/2013 | Bullock | |
| 8,626,568 B2 | 1/2014 | Warkentin et al. | |
| 8,731,768 B2 | 5/2014 | Fernandes et al. | |
| 8,876,535 B2 | 11/2014 | Fields et al. | |
| 8,954,340 B2 | 2/2015 | Sanchez et al. | |
| 8,977,033 B1 | 3/2015 | Maurer et al. | |
| 9,056,616 B1 | 6/2015 | Fields et al. | |
| 9,180,888 B1 | 11/2015 | Fields et al. | |
| 9,198,206 B2 | 11/2015 | Li et al. | |
| 9,279,697 B1 | 3/2016 | Fields et al. | |
| 2002/0181405 A1 | 12/2002 | Ying | |
| 2003/0083079 A1 | 5/2003 | Clark et al. | |
| 2003/0163587 A1 | 8/2003 | Knight et al. | |
| 2003/0195676 A1 | 10/2003 | Kelly et al. | |
| 2003/0228005 A1 | 12/2003 | Melick et al. | |
| 2004/0054452 A1 | 3/2004 | Bjorkman | |
| 2004/0157650 A1 | 8/2004 | Wissinger et al. | |
| 2004/0158476 A1 | 8/2004 | Blessinger et al. | |
| 2004/0176935 A1 | 9/2004 | Sproule et al. | |
| 2004/0236474 A1 | 11/2004 | Chowdhary et al. | |
| 2004/0254698 A1 | 12/2004 | Hubbard et al. | |
| 2005/0038581 A1 | 2/2005 | Kapolka et al. | |
| 2005/0065678 A1 | 3/2005 | Smith et al. | |
| 2005/0065679 A1 | 3/2005 | Kawauchi et al. | |
| 2005/0091018 A1 | 4/2005 | Craft | |
| 2005/0154500 A1 | 7/2005 | Sonnenrein et al. | |
| 2005/0165639 A1 | 7/2005 | Ross et al. | |
| 2005/0203673 A1 | 9/2005 | El-Hajj et al. | |
| 2006/0022842 A1 | 2/2006 | Zoladek et al. | |
| 2006/0109113 A1 | 5/2006 | Reyes et al. | |
| 2006/0247832 A1 | 11/2006 | Taki | |
| 2007/0035632 A1 | 2/2007 | Silvernail et al. | |
| 2007/0038338 A1 | 2/2007 | Larschan et al. | |
| 2007/0038351 A1 | 2/2007 | Larschan et al. | |
| 2007/0038352 A1 | 2/2007 | Larschan et al. | |
| 2007/0038353 A1 | 2/2007 | Larschan et al. | |
| 2007/0050108 A1 | 3/2007 | Larschan et al. | |
| 2007/0122771 A1 | 5/2007 | Maeda et al. | |
| 2007/0257815 A1 | 11/2007 | Gunderson et al. | |
| 2008/0015748 A1 | 1/2008 | Nagy | |
| 2008/0064014 A1 | 3/2008 | Wojtczak et al. | |
| 2008/0082372 A1 | 4/2008 | Burch | |
| 2008/0243558 A1* | 10/2008 | Gupte | G06Q 40/08 705/4 |
| 2008/0255722 A1 | 10/2008 | McClellan et al. | |
| 2009/0069954 A1 | 3/2009 | Aladesuyi | |
| 2009/0079555 A1 | 3/2009 | Aguirre De Carcer et al. | |
| 2009/0135845 A1 | 5/2009 | Husain et al. | |
| 2010/0045452 A1 | 2/2010 | Periwal | |
| 2010/0097208 A1 | 4/2010 | Rosing et al. | |
| 2010/0174576 A1 | 7/2010 | Naylor | |
| 2010/0191411 A1 | 7/2010 | Cook et al. | |
| 2010/0210254 A1 | 8/2010 | Kelly et al. | |
| 2010/0253508 A1 | 10/2010 | Koen et al. | |
| 2010/0256861 A1 | 10/2010 | Hodges | |
| 2010/0256864 A1 | 10/2010 | Ying | |
| 2011/0009107 A1 | 1/2011 | Guba et al. | |
| 2011/0043377 A1 | 2/2011 | McGrath et al. | |
| 2011/0125363 A1 | 5/2011 | Blumer et al. | |
| 2011/0213628 A1 | 9/2011 | Peak et al. | |
| 2011/0251752 A1 | 10/2011 | Delarocheliere et al. | |
| 2011/0254655 A1 | 10/2011 | Maalouf et al. | |
| 2011/0276218 A1 | 11/2011 | Dwan et al. | |
| 2011/0294466 A1 | 12/2011 | Tang et al. | |
| 2011/0307188 A1 | 12/2011 | Peng et al. | |
| 2012/0021386 A1 | 1/2012 | Anderson et al. | |
| 2012/0041638 A1 | 2/2012 | Johnson et al. | |
| 2012/0044052 A1 | 2/2012 | Davis et al. | |
| 2012/0046807 A1 | 2/2012 | Ruther et al. | |
| 2012/0046825 A1 | 2/2012 | Ruther et al. | |
| 2012/0047291 A1 | 2/2012 | Davis et al. | |
| 2012/0135382 A1 | 5/2012 | Winston et al. | |
| 2012/0215375 A1 | 8/2012 | Chang | |
| 2012/0239223 A1 | 9/2012 | Schwarz et al. | |
| 2012/0253888 A1 | 10/2012 | Davidson | |
| 2012/0303392 A1 | 11/2012 | Depura et al. | |
| 2012/0313771 A1 | 12/2012 | Wittliff, III | |
| 2013/0006675 A1 | 1/2013 | Bowne et al. | |
| 2013/0096731 A1 | 4/2013 | Tamari et al. | |
| 2013/0097176 A1 | 4/2013 | Khader et al. | |
| 2013/0164715 A1 | 6/2013 | Hunt et al. | |
| 2013/0179198 A1 | 7/2013 | Bowne et al. | |
| 2013/0184928 A1 | 7/2013 | Kerkhof et al. | |
| 2013/0189649 A1 | 7/2013 | Mannino | |
| 2013/0209968 A1 | 8/2013 | Miller et al. | |
| 2013/0282227 A1 | 10/2013 | Chen et al. | |
| 2013/0282228 A1 | 10/2013 | Cawse et al. | |
| 2013/0289873 A1 | 10/2013 | Mitchell | |
| 2013/0309648 A1 | 11/2013 | Park et al. | |
| 2014/0026660 A1 | 1/2014 | Zhang et al. | |
| 2014/0045147 A1 | 2/2014 | Mohn et al. | |
| 2014/0058616 A1 | 2/2014 | de Oliveira et al. | |
| 2014/0058618 A1 | 2/2014 | Rude et al. | |
| 2014/0080098 A1 | 3/2014 | Price | |
| 2014/0080100 A1 | 3/2014 | Phelan et al. | |
| 2014/0149872 A1* | 5/2014 | Komori | H04M 1/7253 715/736 |
| 2014/0162219 A1 | 6/2014 | Stankoulov | |
| 2014/0163848 A1 | 6/2014 | Tamir et al. | |
| 2014/0168399 A1 | 6/2014 | Plummer et al. | |
| 2014/0189814 A1 | 7/2014 | Marten et al. | |
| 2014/0195102 A1 | 7/2014 | Nathanson | |
| 2014/0195272 A1 | 7/2014 | Sadiq et al. | |
| 2014/0204193 A1 | 7/2014 | Zhang et al. | |
| 2014/0257870 A1 | 9/2014 | Cielocha et al. | |
| 2014/0266660 A1 | 9/2014 | Slaton et al. | |
| 2014/0272810 A1* | 9/2014 | Fields | G09B 19/14 434/65 |
| 2015/0081162 A1 | 3/2015 | Mitchell et al. | |
| 2015/0086953 A1 | 3/2015 | Johansson | |
| 2017/0242247 A1* | 8/2017 | Tso | G02B 5/00 |

OTHER PUBLICATIONS

Final Office Action, U.S. Appl. No. 14/699,758, dated Feb. 2, 2016.
Non-Final Office Action, U.S. Appl. No. 14/494,088, dated Dec. 15, 2014.
Non-Final Office Action, U.S. Appl. No. 14/494,251, dated Nov. 13, 2015.
Non-Final Office Action, U.S. Appl. No. 14/494,251, dated Dec. 5, 2014.
Non-Final Office Action, U.S. Appl. No. 14/699,758, dated Aug. 17, 2015.

(56) References Cited

OTHER PUBLICATIONS

U.S. Appl. No. 14/702,277, Non-Final Office Action, dated May 26, 2015.
Non-Final Office Action, U.S. Appl. No. 14/702,277, dated May 26, 2015.
Non-Final Office Action, U.S. Appl. No. 14/875,826, dated Nov. 6, 2015.
Notice of Allowance, U.S. Appl. No. 14/494,088, dated Mar. 30, 2015.
Notice of Allowance, U.S. Appl. No. 14/494,251, dated Apr. 18, 2016.
Notice of Allowance, U.S. Appl. No. 14/702,277, dated Aug. 18, 2015.
Notice of Allowance, U.S. Appl. No. 14/875,826, dated Jan. 7, 2016.
U.S. Appl. No. 14/494,251, filed Sep. 23, 2014.
U.S. Appl. No. 14/699,758, filed Apr. 29, 2015.
U.S. Appl. No. 14/702,277, filed May 1, 2015.
U.S. Appl. No. 14/703,482, filed May 4, 2015.
U.S. Appl. No. 15/010,074, filed Jan. 29, 2016.
U.S. Appl. No. 15/152,790, filed May 12, 2016.
Notice of Allowance, U.S. Appl. No. 14/703,482, dated Jul. 1, 2016.
U.S. Appl. No. 14/494,088, filed Sep. 23, 2014.

* cited by examiner

REAL-TIME DRIVER OBSERVATION AND PROGRESS MONITORING

CROSS-REFERENCE TO RELATED APPLICATIONS

This application is a continuation of (i) U.S. application Ser. No. 15/410,445, filed Jan. 19, 2017 and titled "Real-Time Driver Observation and Progress Monitoring," which is a continuation of (ii) U.S. application Ser. No. 14/703,482, filed May 4, 2015 and titled "Real-Time Driver Observation and Progress Monitoring," the entire disclosures of which are expressly incorporated herein by reference.

TECHNICAL FIELD

The present disclosure generally relates to a system and a method for observing driving skills of a driver in real-time or near real-time, and, more particularly, to a computer system for collecting and analyzing the real-time data to provide objective feedback regarding the progression of the driver's skills.

BACKGROUND

An important goal of driving instruction is to teach drivers how to drive confidently and safely. In a typical scenario, a student-driver drives a vehicle while a driving-instructor, generally sitting in the passenger seat of the vehicle, observes the student-driver and provides verbal feedback to the student. The student typically relies on the verbal feedback from the driving-instructor to improve his or her skill as a driver. In some instances, the driving-instructor uses pen and paper to make notes based on his or her observations.

SUMMARY

According to an embodiment of the techniques described in the present disclosure, progress of a driver's skill is evaluated based on data collected from one or more sensors utilized to track a driver and/or the vehicle operated by the driver. A driver-evaluation system analyzes the collected data and may provide a display to indicate how the driver's skills are progressing.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Driver evaluation is subjective in nature. Current techniques for driver evaluation fail to effectively track the progress of a driver over time or across multiple driving sessions, for example. In short, it is difficult to objectively evaluate a driver's skill during a single driving session, let alone to then compare such an evaluation to past driving sessions.

Even if the driver or the driving-instructor have a general sense that the driver has improved, the driver and driving-instructor may struggle to identify particular areas where the student-driver has improved or regressed. Without this critical information, the driving-instructor will not be able effectively identify exercises or relevant feedback to (i) positively reinforce improving driver behavior or (ii) correct regressing driving behavior.

The systems and methods described herein enable objective evaluation of driving skill progression (or regression in some instances). In particular, the systems and methods may be implemented to objectively evaluate a driver's skill level and the extent of his or her progress relative to previous driving sessions. As an example, the described systems and methods may be utilized to present visual feedback indicating how a driver is progressing.

Figure 1A:
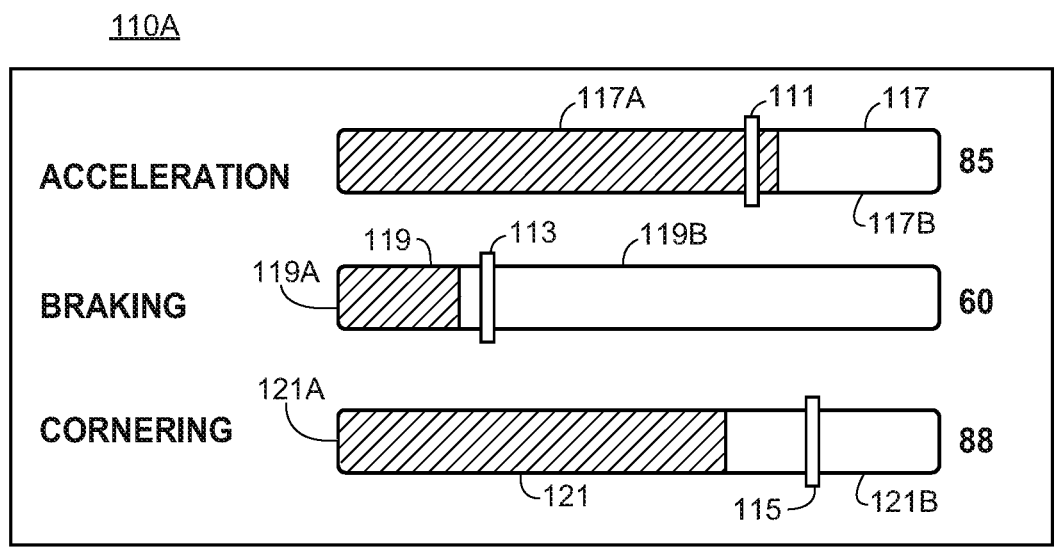
FIG. 1A illustrates an example trend graphic that may be displayed, via a display device, to a user.

FIG. 1A illustrates an example trend graphic 110A (according to an embodiment) that may be displayed, via a display device, to a user. Generally speaking, the trend graphic 110A enables a user to gauge driving skill progress. In particular, the trend graphic 110A provides information about a driver's skill relating to acceleration, braking, and cornering. In this example, the markers 111, 113, and 115 mark a driver's score for acceleration, braking, and cornering, respectively. The bars 117, 119, and 121 mark reference scores to which the driver's scores are being compared. The reference scores may represent various scores. For example, the reference scores may represent scores from the driver's previous driving session. In an embodiment, the reference scores may represent the driver's average scores for multiple previous driving sessions. In some embodiments, the reference scores may represent class average scores (e.g., enabling a driving-instructor to gauge a driver's progress relative to other students). In any event, the trend graphic 110A enables user to gauge driving skill progress.

For example, by viewing the trend graphic 110A a user can observe that the marker 111 is positioned to the left of the end of the bar 117, enabling the user to determine the driver's acceleration score (and thus skill) has regressed. On the other hand, a user may observe that the markers 113 and 115 are positioned to the right of the end of the bars 119 and 121, enabling the user to learn that the driver's braking and cornering scores (and thus skills) have improved. Accordingly, a user can quickly learn how a user is progressing or regressing with respect to his or her driving skills. In some embodiments, the trend graphic 110A may be provided at a display device in real-time or near real-time, enabling a user to get instantaneous or near-instantaneous feedback. The user can utilize this feedback to quickly identify skills on which to focus for improving overall driving behavior.

1. An Example Driver-Evaluation System

Figure 1B:
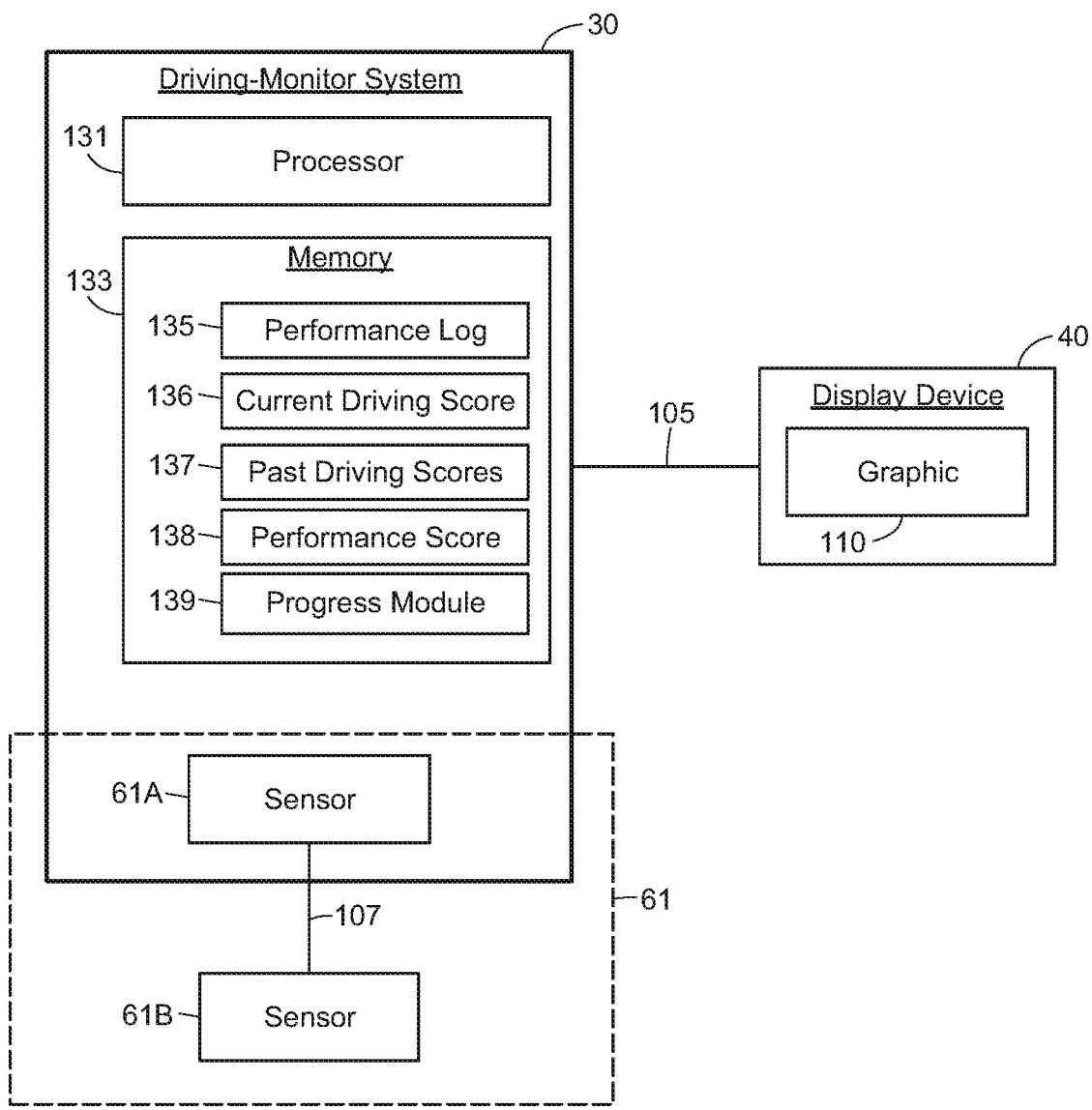
FIG. 1B illustrates a block diagram of an example driver-evaluation system according to an embodiment.

FIG. 1B illustrates a block diagram of an example driver-evaluation system 100 according to an embodiment. The driver-evaluation system 100 may be utilized to present visual information to a user to indicating how a driver's skill or score is progressing. In an embodiment, the driver-evaluation system 100 presents the trend graphic 110A described with reference to FIG. 1A.

In an embodiment, the driver-evaluation system 100 includes a driving-monitor system 30 communicatively connected to a display device 40 via one or more links 105. The driver-evaluation system 100 may also include one or more sensors 61. For example, in an embodiment the driving-monitor system 30 includes a sensor 61A. In some embodiments, the driving-monitor system 30 is communicatively connected to a sensor 61B. The sensor 61B may be communicatively connected to the driving-monitor system 30 via one or more links 107.

The one or more links 105 may be wired or wireless in nature. Similarly, the one or more links 107 may be wired or wireless in nature.

1.1. Example Sensors

In an embodiment, the driver-evaluation system 100 includes one or more sensors 61. For example, in an embodiment the driving-monitor system 30 includes a sensor 61A. In an embodiment, the driver-evaluation system 100 includes a sensor 61B communicatively connected to the driving-monitor system 30 via one or more links 107.

Generally speaking, the sensors 61 detect movement and generate data representing the detected movement (i.e., movement-data). In short, the sensors 61 are generally used to detect movement of a vehicle. For example, the sensors 61 may be installed or otherwise disposed at a vehicle. Thus, in such an example, when the vehicle moves the sensors 61 move. Accordingly, a sensor 61 may detect its own movement and may generate movement-data based on the detected movement. Because the movement of the sensor 61 corresponds to movement of the vehicle, movement of the vehicle can be determined from the movement-data.

The sensors 61 may be used to measure various aspects of or relating to movement, such as position, speed, acceleration, and/or direction of movement. As an example, the sensors 61 may include one or more of: an accelerometer, a GPS receiver, a speedometer, a compass, a gyroscope, a car brake sensor, and/or a tachometer. The sensors 61 may be sensors of a mobile device (e.g., a phone or tablet), a vehicle computer, or an independent electronic device (e.g., a dedicated GPS device).

In example operation, the sensor 61A detects movement and generates movement-data. The movement-data may be transmitted (e.g., via a system bus) to the memory 133 of the driving-monitor system 30.

As for the sensor 61B, in example operation the sensor 61B may detect movement and generate movement-data. The movement-data may be transmitted to the driving-monitor system 30 via the one or more links 107. Regardless of which sensor 61 generates the movement-data, the driving-monitor system 30 may store received movement-data (e.g., at the memory 133) to a performance log 135.

1.2. An Example Driving-Monitor System

The driving-monitor system 30 is an electronic system or device including a processor 131 and a memory 133. In a typical example, the processor 131 and memory 133 are communicatively connected via a link, such as a system bus. The memory 133 may include persistent (e.g., a hard disk) and/or non-persistent (e.g., RAM) components.

The memory 133 stores one or more of: a performance log 135, a driving score 136, driving-scores 137, a progress score 138, and instructions that make up a progress module or application 139 for presenting a display (via the display device 40) to facilitate driver-progress monitoring. In operation, the processor 131 fetches and executes the instructions. In various implementations, the progress module 139 may include compiled instructions, instructions that are interpreted at runtime, etc.

When executed by the processor 131, the progress module 139 causes the driving-monitor system 30 to calculate a driving score 136 based on the performance log 135. As noted above, the performance log 135 may include movement-data representing movement detected by a sensor 61. Calculation of a driving score such as the driving score 136 is described in more detail with reference to FIG. 10.

The progress module 139 also causes the driving-monitor system 30 to compare the calculated driving score 136 to a previously calculated driving score or group of scores 137. Depending on the implementation, the driving score 137 may be any one of: (i) a driving score calculated for the driver for a previous driving session; (ii) a group of scores, or a composite of previous scores, calculated for the driver; (iii) a driving score calculated for a previous driving session for a different driver; (iv) a group of scores, or a composite of previous scores, calculated for other drivers; or (v) some combination thereof. Utilizing driving scores for other drivers may be beneficial for determining how a driving score for a particular driving session compares, for example, to driving scores calculated for other student-drivers in a class.

Based on the comparison of the calculated driving score 136 to the driving score 137, the progress module 139 may cause the driving-monitor system 30 to determine a progress score 138. The progress score 138 may be any record that indicates how the calculated driving score 136 compares to the driving score 137. In particular, the progress score 138 typically indicates an improvement or regression. The progress score 138 may be a simple binary representation (e.g., 0=regression, 1=improvement). In some instances, the progress score 138 may be more complex. For example, the progress score 138 may represent a percent improvement or regression.

After the progress score 138 has been calculated, the progress module 139 may cause the driving-monitor system 30 to transmit, via one or more links 105, video data or image data to the display device 40 to cause the display device 40 to present a trend graphic 110 that has been generated or retrieved from memory based on the calculated progress score 138. In short, the trend graphic 110 indicates whether the driving score 136 represents an improvement or regression relative to a previous driving score (or group of scores) 137. In an embodiment, the trend graphic 110 may be similar, or even identical, to the trend graphic 110A shown in FIG. 1A.

In an embodiment, the link 105 may be a wired or wireless link, and may be connected to the driving-monitor system 30 via a video or graphic interface (not shown) that is communicatively connected to a processor 131 of the driving-monitor system 30. The driving-monitor system 30 may transmit the video data or image data via such a graphic interface.

In some embodiments, the driving-monitor system 30 may transmit the video data or image data via a communication interface (not shown) connected to the processor 131. Such a communication interface may transmit the video data or image data via a wired or wireless link. Further, the communication interface may transmit the video data or image data via a network. For example, the communication interface may transmit the video data or image data via a local area network (LAN) or a personal area network (PAN) to which the driving-monitor system 30 and display device 40 are each coupled.

An example driving-monitor system 330 is described in detail with reference to FIG. 3.

1.3. An Example Display Device

The display device 40 may be any device configured to present visual information. Generally speaking, the display device 40 receives an electrical input signal carrying video or image data. This video or image data may represent a graphic or display generated or rendered by the driving-monitor system 30. In example operation, the received video or image data includes data representing a trend graphic 110. Upon receiving the data, the display device 40 presents the trend graphic 110. It will be noted that the trend graphic 110 may be presented as one graphic or group of graphics which are part of a larger graphical user-interface ("GUI") presented by the display device 40. Generally speaking, the trend graphic 110 is a graphic presented at the display device 40 for purposes of informing a driver of his or her driving skill progress.

Figure 4:
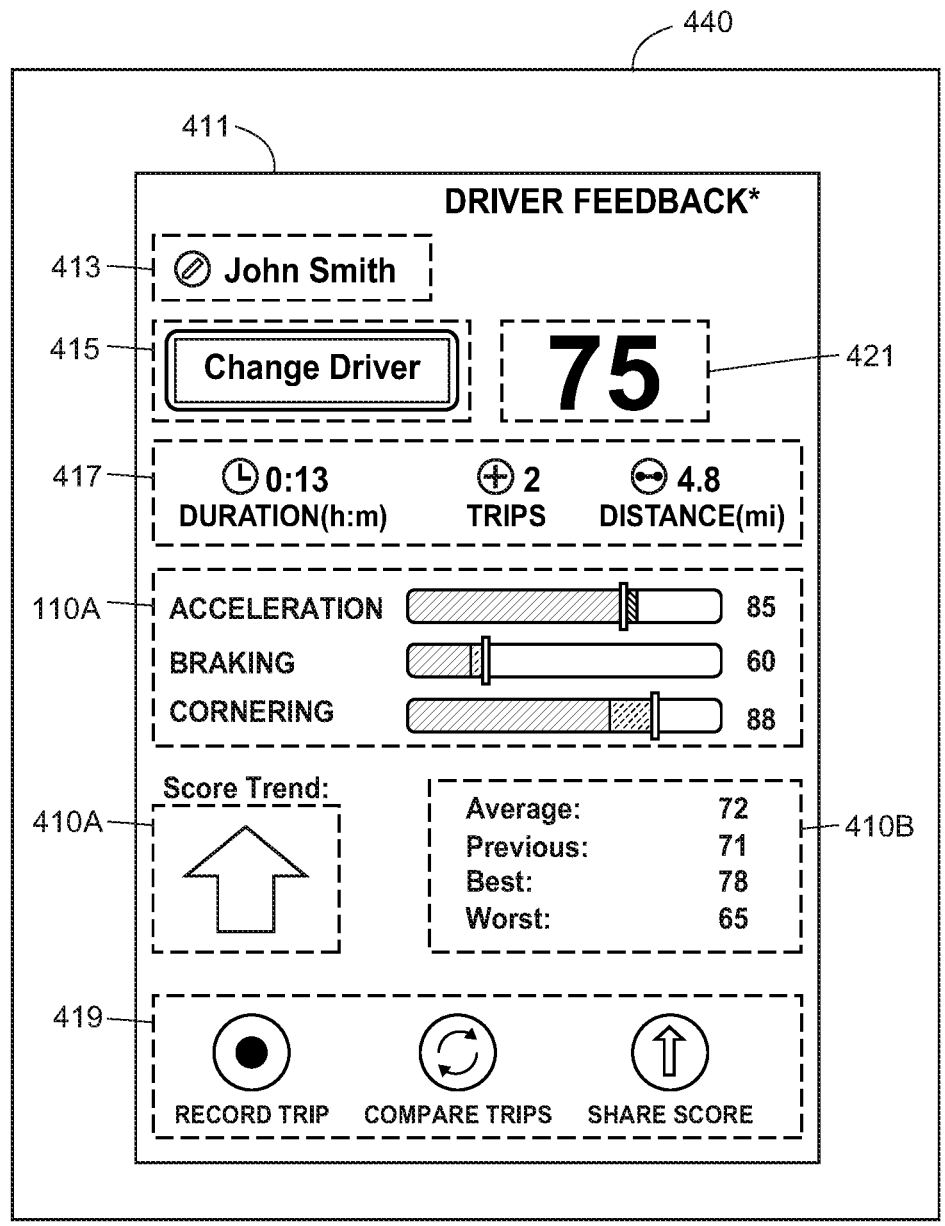
FIG. 4 illustrates an example graphical user-interface (GUI) that may be presented by a display device according to an embodiment.
Figure 5:
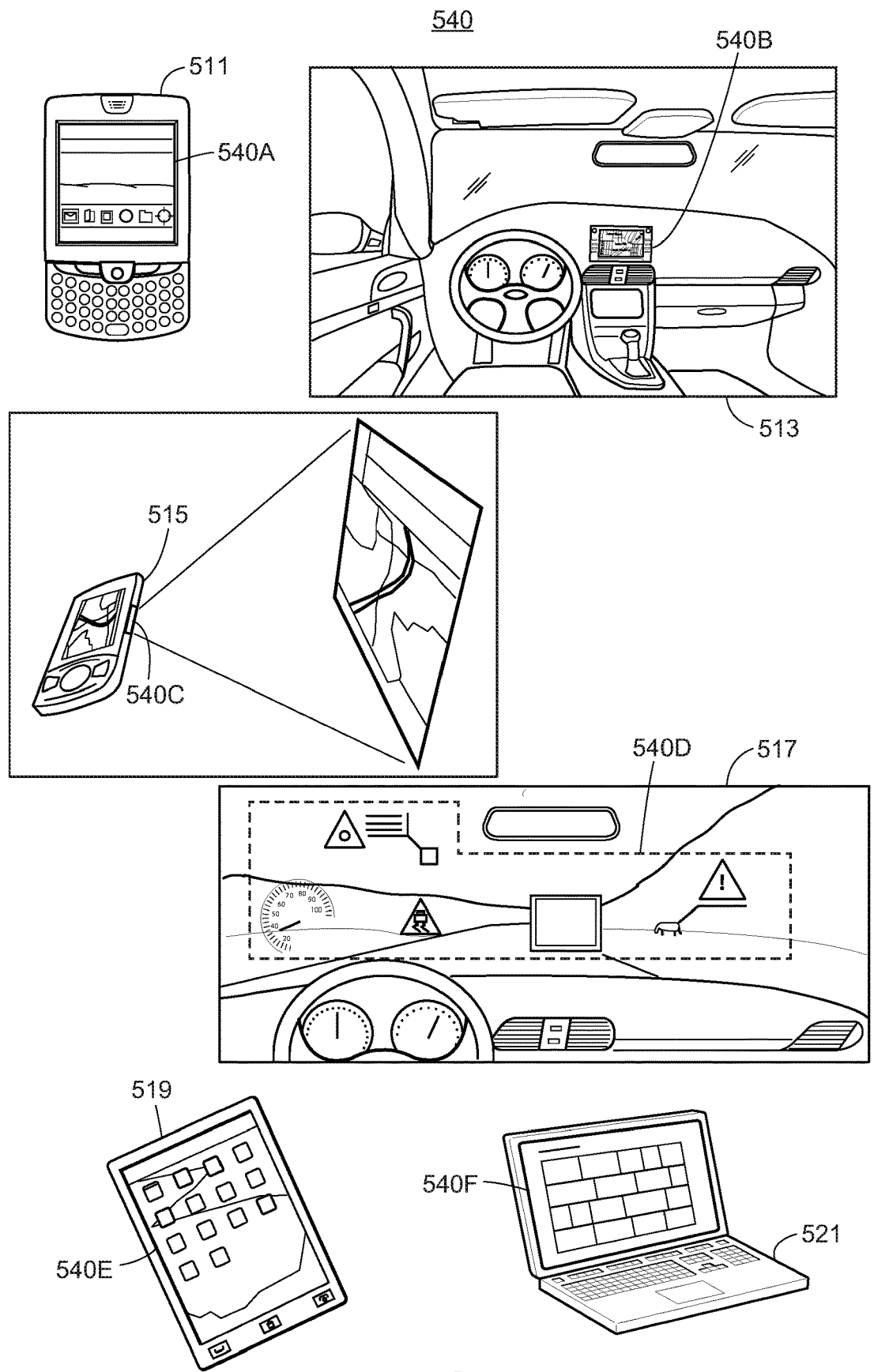
FIG. 5 illustrates example display devices according to various embodiments

FIGS. 4 and 5 illustrate example display devices and trend graphics that may be presented to a user.

1.4. Other Aspects

In an embodiment, one or more of the driving scores 137 are stored at a memory device not located at the driving-monitor system 30. For example, the driving scores 137 may be stored at a server (not shown). The driving-monitor system 30 may communicate with such a server via a network connection (e.g., to the Internet). In such an embodiment, the driving-monitor system 30 may request a driving score 137, and may compare a calculated driving score 136 to a received driving score 137.

Further, in some embodiments the driving-monitor system 30 may transmit the calculated driving score 136 to a server for comparison to a driving score 137. In such embodiments, the driving-monitor system 30 may subsequently receive a progress score 138, determined based on the comparison, from the server. The driving-monitor system 30 may then transmit video data or image data to the display device 40 to cause the display device 40 to present a trend graphic 110 that has been generated or retrieved from memory based on the received progress score 138.

In an embodiment, the driving-monitor system 30 transmits movement-data to a server for driving score calculation and/or for comparison to a driving score 137. In other words, a server may handle the driving score calculation and/or comparison to other driving scores 137. In such an embodiment, the driving-monitor system 30 may receive a progress score 138 from the server.

In an embodiment, the driving-monitor system 30 may transmit video data to the display device 40 to cause the display device 40 to present the driving score 136. In other words, the display device 40 may display both the trend graphic 110 and the driving score 136.

It will be noted that in some embodiments, the driving-monitor system 30 is not connected to the sensor 61B. For example, the driving-monitor system 30 may utilize the sensor 61A, but not the 61B. In other embodiments, the driving-monitor system 30 may utilize the 61B, but not the sensor 61A. In some embodiments, the driving-monitor system 30 utilizes both the sensor 61A and the sensor 61B.

2. An Example Method for Evaluating Driver Progress

Figure 2:
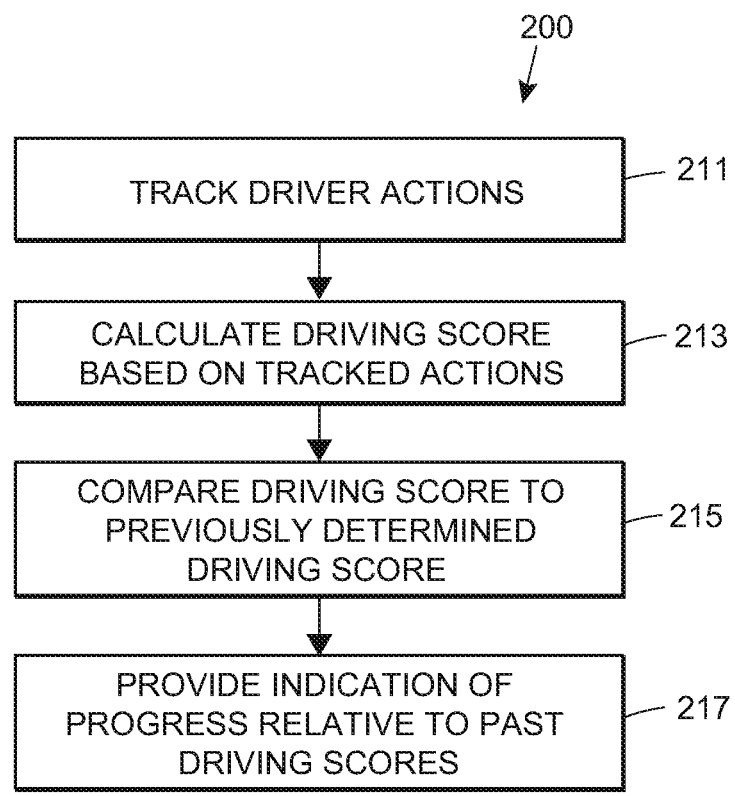
FIG. 2 illustrates an example method for evaluating driver progress according to an embodiment.

FIG. 2 illustrates an example method 200 for evaluating driver progress according to an embodiment. The method 200 may be implemented by the driver-evaluation system 100 shown in FIG. 1B. The method 200 may be saved as a set of instructions, routines, programs, or modules at computer readable media found, for example, in memory devices accessible by the driver-evaluation system 100. For example, some or all of the method 200 may be saved as the progress module 139 described with reference to FIG. 1B. While the method 200 is described with reference to the driver-evaluation system 100 and the driving-monitor system 30 shown in FIG. 1B, the method 200 may be implemented according to other embodiments not depicted in FIG. 1B. For example, the method 200 may also be implemented, at least in part, by the driving-monitor system 330 shown in FIG. 3.

2.1. Driver Tracking

The method 20 begins when a driver's actions are tracked (block 211). Tracking a driver's action may include tracking movement of a vehicle (e.g., via one of the sensors 61 described with reference to FIG. 1B) and/or tracking the driver himself or herself (e.g., via a camera).

2.2. Driving Score Generation

After tracking the driver, a driving score 136 is calculated based on the tracked actions (block 213). The driving score 136 may be calculated by the driving-monitor system 30 shown in FIG. 1B based on data in the performance log 135 shown in FIG. 1B. In particular, the driving score may be calculated based on movement-data generated, e.g., by one of the sensors 61 shown in FIG. 1B. An example method for calculating a driving score is described in more detail with reference to FIG. 10.

2.3. Progress Determination

After a driving score 136 has been calculated, the calculated driving score 136 may be compared to one or more other driving scores (block 215). The comparison may be used to calculate a progress score 138. The progress score 138 may be any record that indicates how the calculated driving score compares to the calculated driving score. In particular, the progress score 138 typically indicates an improvement or regression. The progress score 138 may be a simple binary representation (e.g., 0=regression, 1=improvement). For example, if the calculated driving score is 78 and the comparison score is 75, the progress score 138 may be 1 (e.g., indicating an improvement). Alternatively, if the comparison score is 80, the progress score 138 may be 0 (e.g., indicating regression).

In some instances, the progress score 138 may be more complex. For example, the progress score 138 may be ternary in nature (i.e., three possible values). As an example, the progress score 138 may be −1 (e.g., indicating regression), 0 (e.g., indicating stasis or lack of change in the score), or 1 (e.g., indicating improvement). In some instances, the progress score 138 may be a percent. With reference to the previous example, if the driving score is 78 and the comparison score is 75, the progress score 138 may be 4% (i.e., the driving score is a 4% improvement over the previous score). Regardless of the exact nature of the progress score 138, it is possible to determine whether a driving score represents an improvement or not.

2.4. Progress Notification

After the calculated driving score 136 has been compared to one or more other driving scores 137, an indication of the driver's progress may be provided (block 217). In a typical example, the display device 40 (shown in FIG. 1B) presents the indication. Examples of such an indication include the trend graphic 110 (shown in FIG. 1B) and the trend graphics 410 (shown in FIG. 4). In short, the indication is a visual representation of the progress score 138 determined by comparing the calculated driving score 136 to a previous driving skill score 137.

3. An Example Driving-Monitor System

Figure 3:
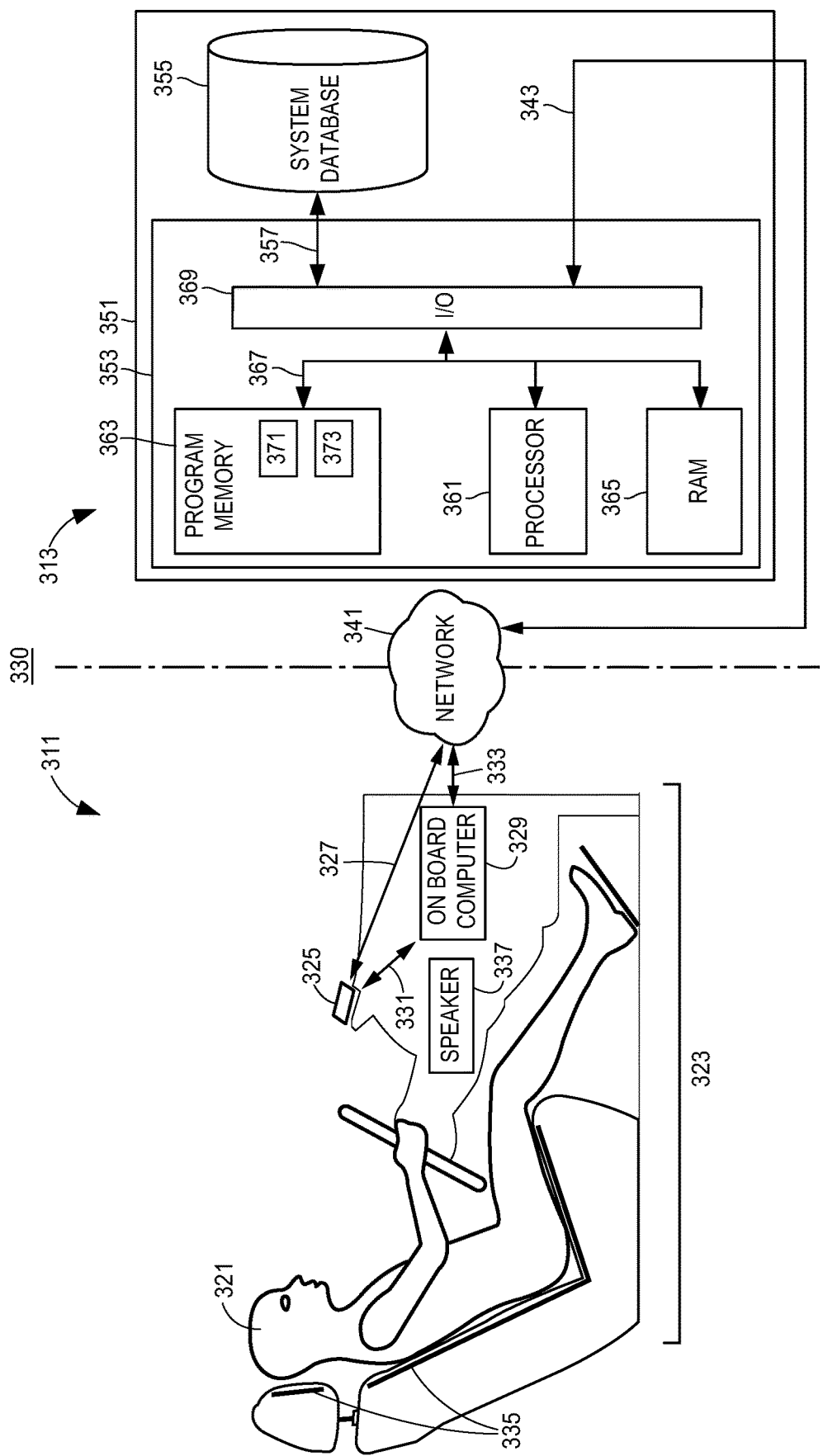
FIG. 3 illustrates a block diagram of an example driver-evaluation system according to an embodiment.

FIG. 3 illustrates a block diagram of an example driver-evaluation system 300 according to an embodiment. The driver-evaluation system 300 is a computer system for performing at least one of: driver tracking (e.g., see block 211 shown in FIG. 2), driving score calculation (e.g., see block 213 shown in FIG. 2), progress determination (e.g., see block 215 shown in FIG. 2), and/or progress display (e.g., see block 217 shown in FIG. 2). The driver-evaluation system 300 may be similar in nature to the driver-evaluation system 100, capable of performing similar functions and interfacing with similar systems. In particular, the driver-evaluation system 300 may include a driving-monitor system 330, which may be similar to the driving-monitor system 30. In an embodiment, the driving-monitor system 330 may include front-end components 311 and/or back-end components 313. The driving-monitor system 330 may include one or more of: a mobile device 325, an on-board computer 329, and a server 351.

3.1. Example Communications Between the Driving-Monitor System 330 and Other Devices/Systems The driver-evaluation system 300 may include a display device 40 (shown in FIG. 1B). For example, the mobile device 325 of the driving-monitor system 330 may be coupled to an integrated display (not shown) that shares a housing with other components of the mobile device 325. As another example, the on-board computer 329 of the driving-monitor system 330 may be coupled to a display device (not shown) installed in the dash of the vehicle 323. In an embodiment, the display device 40 is a display independent of the mobile device 325 and the on-board computer 329. For example, the display device 40 may be a display of a tablet or computer not shown in FIG. 3.

Further, the driver-evaluation system 300 may include a sensor 61 (shown in FIG. 1B). For example, the mobile device 325 or the on-board computer 329 may include a sensor 61. In some instances, the driving-monitor system 330 may communicate with a sensor 61 (e.g., via the mobile device 325 or the on-board computer 329) that is installed or otherwise disposed in the vehicle (e.g., via a wired or wireless link). For example, the driving-monitor system 330 may communicate with a dedicate GPS receiver (not shown) disposed in the vehicle (e.g., in the interior, such as in the cabin, trunk, or engine compartment, or on the exterior of the vehicle).

3.2. Example Components of the Driving-Monitor System 330

The high-level architecture of the driving-monitor system 330 includes both hardware and software applications, as well as various data communication channels or links for sending and receiving data between the various hardware and software components. The driving-monitor system 330 may be roughly divided into front-end components 311 and back-end components 313. The front-end 311 may be communicatively coupled to the back-end 313 via the network 341.

The network 341 may be a proprietary network, a secure public internet, a virtual private network or some other type of network, such as dedicated access lines, plain ordinary telephone lines, satellite links, combinations of these, etc. Where the network 341 comprises the Internet, data communications may take place over the network 341 via an Internet communication protocol.

3.2(A) The Front-End Components 311

The front-end components 311 of the driving-monitor system 330 may be installed or located at a vehicle 323, which may be driven by a driver 321. The front-end 311 includes a mobile device 325 and/or an on-board computer 329. In some embodiments the front-end 311 may include a tactile alert system 335 and/or one or more speakers 337. The front-end components 311 may be communicatively connected to the network 341 via the link 327 and/or the link 333. The links 327 and 333 may each be wireless or wired, depending on the embodiment.

The mobile device 325 is an electronic device that may be permanently or removably installed in the vehicle 323 (e.g., a car, truck, etc.). The mobile device 325 may be a general-use mobile personal computer, cellular phone, smart phone, tablet computer, other wearable computer (e.g., a watch, glasses, etc.), a dedicated driving-monitor computer, etc.

In an embodiment, the mobile device 325 may be communicatively connected to the network 341 via the link 327. The mobile device 325 may include a communication interface (not shown) for sending and receiving data via the link 327. In some embodiments, the mobile device 325 is not connected to the network 341

The on-board computer 329 is an electronic device that may be permanently or temporarily installed in the vehicle 323. The on-board computer 329 may be a general-use on-board computer capable of performing many functions relating to vehicle operation or a dedicated driver's education evaluation computer. The on-board computer 329 may be installed by the manufacturer of the vehicle 323 or as an aftermarket modification to the vehicle 323.

The on-board computer 329 may be communicatively connected to the network 341 via the link 333. The on-board computer 329 may include a communication interface (not shown) for sending and receiving data via the link 333. In some embodiments, the on-board computer 329 is not connected to the network 341. The on-board computer 329 may be communicatively connected to various sensors in the vehicle 323 (e.g., a braking sensor, a speedometer, a tachometer, etc.) and/or may interface with various external output devices in the vehicle 323 such the tactile alert system 335, one or more speakers 337, one or more displays (not shown), etc.

In some embodiments, the mobile device 325 may be communicatively connected to the on-board computer 329 via the link 331. Such a connection may be beneficial where the mobile device 325 and the on-board computer 329 each perform one or more functions of the driving-monitor system 330. The link 331 may be a wired or wireless connection. In some embodiments, the mobile device 325 is not communicatively connected to the on-board computer 329. In some embodiments, the mobile device 325 and/or on-board computer 329 may be a thin-client device which outsources some or most processing to the server 351.

3.2(B) The Back-End Components 313

The back-end components 313 may be installed or otherwise disposed at a remote location relative to the vehicle 323 (e.g., at a data center). The back-end 313 may include a server 351, which may include one or more computer processors adapted and configured to execute various software applications and components of the driving-monitor system 330, in addition to other software applications. The back-end 313 may be communicatively connected to the network 341 via a link 343, which may be wireless or wired.

The server 351 may include a controller 353 and/or a database 355. The controller 353 may include a processor 361 communicatively connected, via a link 367, to one or more of: a memory 363 (e.g., program memory), a memory 365 (e.g., RAM), and an I/O interface 369. In an embodiment, the memory 363 stores computer-readable instructions that when executed by the processor 361 cause the server 351 to implement a server application 371 and/or a web server 373. The instructions for the server application 371 may cause the server 351 to implement, at least in part, the methods described herein. That is, the server application 371 may cause the server 351 to calculate a driving score, compare a driving score to other driving scores, determine a progress score, and/or generate or select a trend graphic 110 (shown in FIG. 1B). In some embodiments the methods described herein are implemented without the server 351.

The controller 353 may be communicatively connected to the network 341 via a link 343 and the I/O circuit 369. Further, the controller 353 may be communicatively connected to the database 355 via a link 367.

3.3. Example Operation of the Driving-Monitor System 330

In example operation, one or more drivers 321 may operate the vehicle 323. While shown in a slightly reclined sitting position, those of ordinary skill in the art will appreciate that the driver 321 may be situated in any number of ways (e.g., reclining at a different angle, standing, etc.) and operating the vehicle using controls other than the steering wheel and pedals shown in FIG. 3 (e.g., one or more sticks, yokes, levers, etc.).

3.3(A) Driver Tracking

A sensor 61 (shown in FIG. 1B) may detect movement of the vehicle 323 while the driver 321 operates the vehicle 323. The sensor 61 may then transmit movement-data, representing the detected movement, to the driving-monitor system 330.

For example, the movement-data may be transmitted to the mobile device 325 or to the on-board computer 329, depending on the embodiment. In an embodiment, the sensor 61 may be a sensor of driving-monitor system 330. For example, the sensor 61 may be a sensor of the mobile device 325 or of the on-board computer 329. In some embodiments, the sensor 61 is a sensor for a device that is independent of the mobile device 325 and on-board computer 329.

3.3(B) Driving Score Calculation

After the driving-monitor system 330 receives the movement-data (e.g., at the mobile device 325), the driving-monitor system 330 may calculate a driving score based on the movement-data. For example, the mobile device 325 or on-board computer 329 may calculate a driving score based on the movement-data. The mobile device 325 or on-board computer 329 may retrieve the movement-data from a performance log 135 (shown in FIG. 1B), which may be stored at the mobile device 325, the on-board computer 329, or the server 351.

Alternatively, the server 351 may calculate the driving score. In such an embodiment, either the mobile device 325 or the on-board computer 329 may transmit the movement-data to the server 351. The server 351 may then calculate the driving score based on the received movement-data. In some embodiments, server 351 may transmit the calculated driving score to the mobile device 325 or the on-board computer 329.

3.3(C) Progress Determination

After a driving score is calculated, the driving-monitor system 330 may compare the calculated driving score to other previously calculated driving scores (which may be stored to memory at the mobile device 325, on-board computer 329, or server 351, depending on the embodiment). The comparison may be performed, e.g., by the mobile device 325, the on-board computer 329 or the server 351, depending on the embodiment.

In an embodiment, whichever of the mobile device 325, on-board computer 329, and server 351 performs the comparison may notify one or more of the other systems of the results of the comparison. For example, the server 351 may perform the comparison and send a signal to the mobile device 325 and/or on-board computer 329 to notify the mobile device 325 and/or on-board computer 329 of the comparison results. In an embodiment, the server 351 calculates a progress score based on the comparison and sends the calculated progress score to the mobile device 325 and/or on-board computer 329 (via the network 341).

In an embodiment, the mobile device 325 performs the comparison and sends a signal to the on-board computer 329 and/or server 351 to notify the computer 329 and/or server 351 of the comparison results. For example, the mobile device 325 may send a progress score, calculated based on the comparison, to the server 351. The server 351 may update records stored at the database 355 based on the received progress score.

3.3(D) Trend/Progress Display

Based on the results of the comparison, the driving-monitor system 330 generates or selects a graphic (e.g., trend graphic 110 shown in FIG. 1) for indicating whether the calculated driving score represents an improvement or regression relative to a previous driving score to which it was compared. The driving-monitor system 330 then transmits data representing the graphic to a display device 40, where the graphic is displayed. The display device 40 may be a display screen for the mobile device 325, a display screen for a second mobile device 325, a display coupled to the on-board computer 329, or a display for another device.

In an embodiment, the mobile device 325 generates or selects the graphic. Further, the display device 40 may be a display screen of the mobile device 325. Accordingly, the display device 40 may receive the data representing the graphic via a system bus of the mobile device 325. Similarly, in some embodiments the graphic may be selected and displayed by the on-board computer 329.

In some embodiments, the graphic may be selected by one of the mobile device 325 or on-board computer 329, and the data representing the graphic may be transmitted to the other of the mobile device 325 and on-board computer 329 via the link 331 or network 341.

3.4. Other Aspects of the Driving-Monitor System 330

Depending on the embodiment, the driving-monitor system 330 may have various configurations. For example, in an embodiment the driving-monitor system 330 may include only the front-end 311. In other words, the functionality of the driving-monitor system 330 may be provided entirely by the front-end 311 in some embodiments. Further, a mobile device 325 may perform all of the processing associated with data collection and driver tracking, driving score calculation, progress determination, and progress display. In an embodiment, the on-board computer 329 may similarly perform all of the processing. As such, the driving-monitor system 330 may be a "stand-alone" system, neither sending nor receiving information over the network 341.

In some embodiments, the driving-monitor system 330 may be a distributed system where the functionality of the driving-monitor system 330 is divided between the front-end 311 and back-end 313.

More generally speaking, although the driving-monitor system 330 is shown to include one server 351, one mobile device 325, and one on-board computer 329, it should be understood that different numbers of servers 351, devices 325, and on-board computers 329 may be utilized. For example, the system 329 may include a plurality of servers 351 and/or a plurality of devices 325, all of which may be interconnected via the network 341.

3.4(A) Other Aspects of the Front-End 311

Further, the front-end 311 may have various configurations depending on the embodiment. For example, in an embodiment the front-end 311 may include only one of the mobile device 325 and the on-board computer 329. In other words, most or all of the functions performed by the front-end 311 may be performed by only one of the mobile device 325 and on-board computer 329. Thus, in some embodiments the mobile device 325 may perform the various functions described herein alone, and the on-board computer 329 need not be present. Similarly, in some embodiments the on-board computer 329 may perform the various functions described herein alone, and the mobile device 325 need not be present.

Moreover, in some embodiments the front-end 311 includes both the mobile device 325 and the on-board computer 329. In such embodiments, the functions performed by the front-end 311 may be divided between the mobile device 325 and the on-board computer 329. In other words, the mobile device 325 and on-board computer 329 may operate in conjunction to provide the functionality of the front-end 311 (and in some cases, the functionality of the driving-monitor system 330). Similarly, the functionality of the driving-monitor system 330 may be divided between the front-end 311 and the back-end 313.

In an embodiment, the driver 321 may receive tactile alerts presented via the tactile alert system 335. Such alerts may be presented on command from the mobile device 335 and/or the on-board computer on-board computer 329.

3.4(B) Other Aspects of the Back-End 313

The processing performed by the one or more servers 351 may be distributed among a plurality of servers 351 in an arrangement referred to as "cloud computing." This configuration may provide several advantages, such as, for example, enabling near real-time uploads and downloads of information as well as periodic uploads and downloads of information. This may provide for a thin-client embodiment of the mobile device 325 and/or on-board computer 329 discussed herein as well as a primary backup of some or all of the data gathered by the mobile device 325 and/or on-board computer 329.

Moreover, it should be noted that while not shown, additional databases may be linked to the controller 353 in a known manner. While shown as a single block in FIG. 3, it will be appreciated that the server application 371 may include a number of different programs, modules, routines, and sub-routines that may collectively cause the server 351 to implement the server application 371. While the instructions for the server application 371 and web server 373 are shown as stored in the memory 363, the instructions may additionally or alternatively be stored in the database 355 and/or memory 365. It should be appreciated that although only one processor/microprocessor 361 is shown, the controller 353 may include multiple processors/microprocessors 361.

Additionally, the memories 363 and 365 may be implemented in various forms. For example, the memories 363 and 365 may be implemented as semiconductor memories, magnetically readable memories, and/or optically readable memories. Moreover, the controller 353 may include additional memory devices not shown in FIG. 3.

In example operation, the database 355 stores data related to the operation of the driving-monitor system 330. Such data might include, for example, data collected by a mobile device 325 and/or on-board computer 329 pertaining to the driving-monitor system 330 and uploaded to the server 355, such as images, sensor inputs, data analyzed according to the methods discussed below, or other kinds of data. The server 351 may access data stored in the database 335 when executing various functions and tasks associated with the operation of the driving-monitor system 330. The data in the database 355 may be stored at one or more memory devices communicatively connected to the controller 353 (e.g., via the link 357). In an embodiment, data in the database 355 is stored at the memory 363 and/or the memory 365.

Although the I/O circuit 369 is shown as a single block, it should be appreciated that the I/O circuit 369 may include a number of different types of I/O circuits.

4. An Example Graphical User Interface ("GUI")

FIG. 4 illustrates an example GUI 411 that may be presented by a display device 440 according to an embodiment. Generally speaking, the display device 440 presents a GUI 411 including a trend graphic (e.g., trend graphic 110 shown in FIG. 1B) that has been selected or generated (e.g., by the driving-monitor system 30 shown in FIG. 1B) based on a progress score (e.g., progress score 138 shown in FIG. 1B) and/or results from a comparison between a calculated driving score (e.g., driving score 136 shown in FIG. 1B) and one or more previously calculated driving scores (e.g., driving scores 137 shown in FIG. 1B). FIG. 2 illustrates an example method 200 that may be implemented to select or generate such a trend graphic.

4.1. The Display Device 440

In an embodiment, the display device 440 may be part of the driver-evaluation system 100 shown in FIG. 1B, and may be utilized in place of or in addition to the display device 40 shown in FIG. 1B. Similarly, the display device 440 may be part of the driver-evaluation system 300 shown in FIG. 3, and may, e.g., present a display based on data received from the driving-monitor system 330 shown in FIG. 3. Generally speaking, the display device 440 is similar in nature to the display device 40, capable of performing similar functions and interfacing with similar systems.

In an embodiment, the display device 440 may present the trend graphic 110 shown in FIG. 1B. More generally, the display device 440 may present visual information based on video data or image data received from a driving-monitor system such as the driving-monitor system 30 shown in FIG. 1B or the driving-monitor system 330 shown in FIG. 3. In some embodiments, the display device 440 may present visual information based on video data or image data received from the mobile device 325 or from the on-board computer 329 shown in FIG. 3.

4.2. The GUI 411

The display device 440 may present, via the GUI 411, a number of graphics and/or input elements. For example, the GUI 411 may include: trend graphic 110A; a trend graphic 410A; a trend graphic 410B; a driver-name graphic 413; a input element 415; a session statistics graphic 417; a input elements 419; and/or score graphic 421.

4.3. The Trend Graphic 110A

The trend graphic 110A includes driving scores for three sub-skills (i.e., acceleration, braking, and cornering). The trend graphic 110A also includes graphs illustrating how each of the sub-skill compares to previous sub-skill scores. In particular, the trend graphic 110A indicates that the acceleration score has regressed, while the braking and cornering scores have improved. The trend graphic 110A is described in detail with reference to FIG. 1A.

4.4. The Trend Graphic 410A

The trend graphic 410A is an example trend graphic that may be displayed by the display device 440. In the shown example, the trend graphic 410A is an arrow. The upward facing arrow indicates that the calculated driving score is an improvement (relative to one or more previous scores). When the calculated driving score represents a regression, the trend graphic 410A may alternatively be a downward facing arrow. In short, the trend graphic 410A is an example graphic that may indicate one of two statuses: improvement or regression.

4.5. The Trend Graphic 410B

The trend graphic 410B includes text. More particularly, the trend graphic 410B includes numbers quantifying how the driving score is trending. In combination with the score graphic 421, a user can quickly identify how his or her most recent score is trending relative to historical data. That is, the user can quickly determine how his or her score compares to his or her previous score, best score, and/or worst score. Depending on the embodiment, the trend graphic 410A may represent a trend relative to any of the aforementioned scores.

4.6. The Driver-Name Graphic 413

The driver-name graphic 413 identifies the current driver participating in the driving session. For example, the driver-name graphic 413 may identify the driver 321 shown in FIG. 3. The driver-name graphic 413 may be useful, e.g., to a driving-instructor teaching or evaluating multiple students. In other words, the driver-name graphic 413 enables a user to view the display device 440 and determine the identity of a driver who received the driving score shown by the score graphic 421.

4.7. The Input Element 415

The input element 415 is a touch graphic that enables a user (e.g., a driving-instructor) to change drivers. This may be useful where a driving-instructor is teaching or evaluating multiple students.

4.8. The Session Statistics Graphic 417

The session statistics graphic 417 includes statistics about the driver's most recent driving session, such as the driving duration, the number of trips the driver has taken, and the distance of the most recent driving session.

4.9. Input Elements 419

The input elements 419 enable a user to interact with the GUI 411. In particular, a user may interact with (e.g., via touch) one of the input elements 419 to begin recording a driving session. Such an action causes the driver-evaluation system 100 to begin tracking the driver for a particular driving session. When the driving session has finished, a user may interact with one of the input elements 419 again to stop recording. Another one of the input elements 419 enables a user to compare his driving session to other driving sessions. Finally one of the input elements 419 enables a driver to share his driving trip information via a social network or email.

4.10. The Score Graphic 421

The score graphic 421 displays the driving score (e.g., driving score 136 shown in FIG. 1B) calculated for the most recent driving session.

4.11. Other Aspects

In an embodiment, the GUI 411 may not include input elements. For example, the display device 440 may be a display screen that is not configured for user interaction. In such an example, the display device 40 may present the GUI 411 without interactive elements such as the input elements 415 and 419.

5. Example Display Devices

FIG. 5 illustrates example display devices 540 according to various embodiments. Each of the display devices 540 may be part of the driver-evaluation system 100 shown in FIG. 1B, and may be utilized in place of or in addition to the display device 40 shown in FIG. 1B. Each display device 540 may be similar in nature to the display device 40, capable of performing similar functions and interfacing with similar systems.

In an embodiment, the display devices 540 may present the trend graphic 110 shown in FIG. 1B. More generally, the display devices 540 may present visual information based on video data or image data received from a driving-monitor system such as the driving-monitor system 30 shown in FIG. 1B or the driving-monitor system 330 shown in FIG. 3. In some embodiments, the display device 540 may present visual information based on video data or image data received from the mobile device 325 or from the on-board computer 329 shown in FIG. 3.

The display device 540A is a screen of a mobile phone 511. The display device 540B is an in-dash display for a vehicle 513. The display device 540C is a projector for a projector device 515. The display device 540D is a heads-up display (HUD) for a vehicle 517. The display device 540E is a screen for a tablet 519. The display device 540F is a screen for a computer 521.

6. An Example Mobile Device

Figure 6:
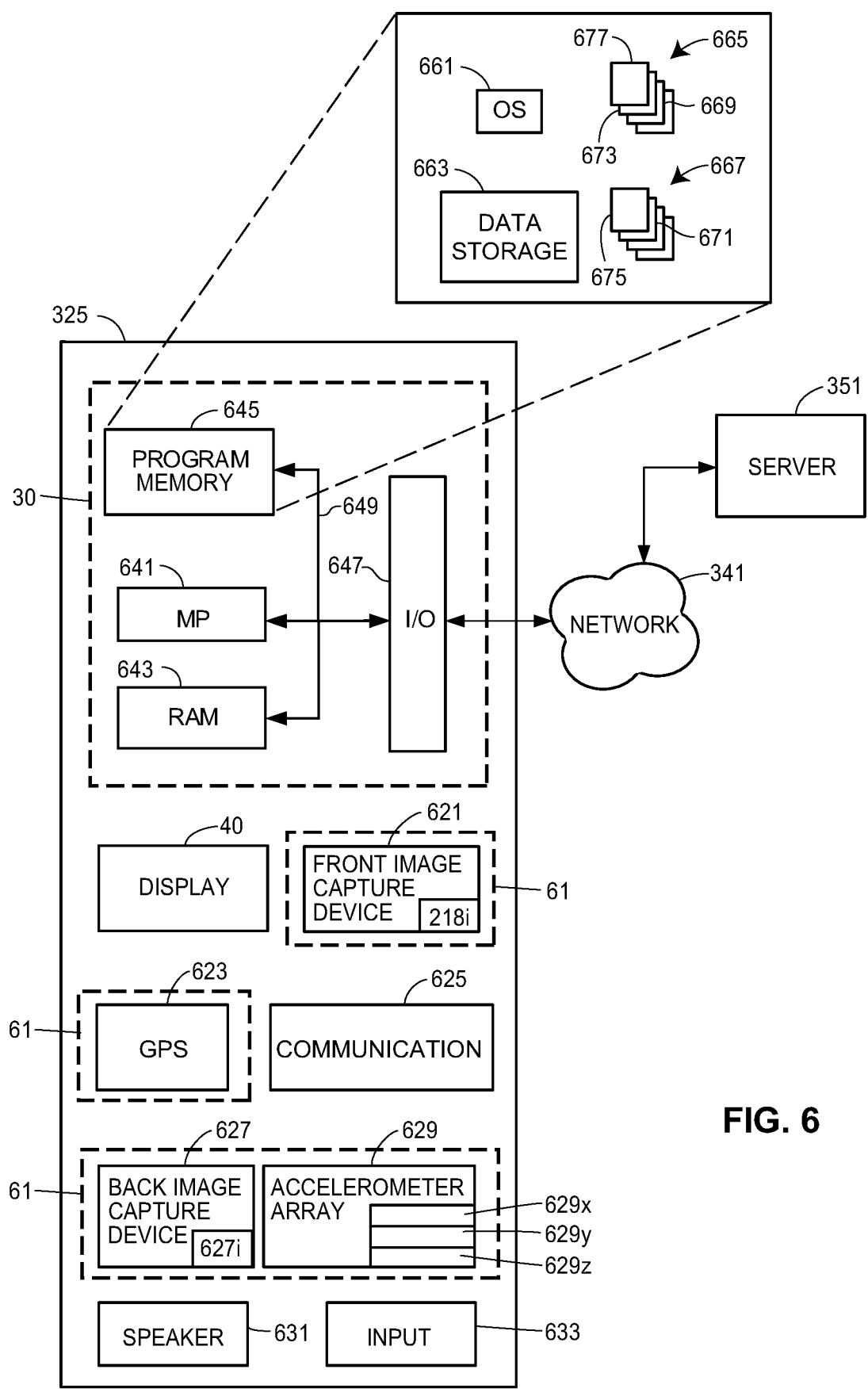
FIG. 6 illustrates a block diagram of an example mobile device according to an embodiment.

FIG. 6 illustrates a block diagram of an example mobile device 325 according to an embodiment. The mobile device 325 may be used for: driver tracking (e.g., see block 211 shown in FIG. 2), driving score calculation (e.g., see block 213 shown in FIG. 2), progress determination (e.g., see block 215 shown in FIG. 2), and/or progress display (e.g., see block 217 shown in FIG. 2). In an embodiment, the mobile device 325 performs one or more of these functions independently. In some embodiments, the mobile device 325 interacts with a on-board computer 329 (shown in FIG. 3) and/or a server 351 (shown in FIG. 3) to provide one or more of these functions.

The mobile device 325 and server 351 may be communicatively connected via a network 341. The server 351 may be installed or otherwise disposed at a remote location relative to the mobile device 325 (e.g., at a data center). The network 341 may be any suitable network. It will be understood that the on-board computer 329 shown in FIG. 3 may include many of the same components as those included in the mobile device 325, and may provide similar functionality (as noted with reference to FIG. 3).

In an embodiment, the mobile device 325 includes a controller 611. In embodiment, the mobile device 325 may include only the controller 611. Further, in some embodiments the driving-monitor system 330 shown in FIG. 3 may include only the controller 611. In other words, the functionality of the driving-monitor system 330 may be provided entirely by the controller 611 in some embodiments.

In some embodiments, the mobile device 325 may include one or more sensors 61 (e.g., a front image capture device 621, a GPS 623, back image capture device 627, and/or accelerometer array 629) and/or a display device 40. In an embodiment, the mobile device 325 may include a communication interface 625, a speaker 631, and/or a user-input device 633. In some embodiments, the on-board computer 329 may include at least one of: the controller 611, one or more sensors 61, the display device 40, the communication unit 625, the speaker 631, and/or the user-input device 633.

The front and back image capture devices 621 and 627 may be built-in cameras within the mobile device 325 and/or may be peripheral cameras, such as webcams, cameras installed inside the vehicle 323, cameras installed outside the vehicle 323, etc., that are communicatively coupled with the mobile device 325. The front image capture device 621 may be oriented toward the driver 321 to observe the driver 321 as described below. The back image capture device 627 may be oriented toward the front of the vehicle 323 to observe the road, lane markings, and/or other objects in front of the vehicle 323. Some embodiments may have both a front image capture device 621 and a back image capture device 627, but other embodiments may have only one or the other. Further, either or both of the front image capture device 621 and back image capture device 627 may include an infrared illuminator 621i, 627i, respectively, to facilitate low light and/or night image capturing. Such an infrared illuminator 621i, 627i may be automatically activated when light is insufficient for image capturing.

The GPS unit 623 may use "Assisted GPS" (A-GPS), satellite GPS, or any other suitable global positioning protocol (e.g., the GLONASS system operated by the Russian government) or system that locates the position of the mobile device 325. For example, A-GPS utilizes terrestrial cell phone towers or Wi-Fi hotspots (e.g., wireless router points) to more accurately and more quickly determine location of the mobile device 325, while satellite GPS generally are more useful in more remote regions that lack cell towers or Wi-Fi hotspots.

The accelerometer array 629 may be one or more accelerometers positioned to determine the force and direction of movements of the mobile device 325. In some embodiments, the accelerometer array 629 may include an X-axis accelerometer 629x, a Y-axis accelerometer 629y, and a Z-axis accelerometer 629z to measure the force and direction of movement in each dimension respectively. It will be appreciated by those of ordinary skill in the art that a three dimensional vector describing a movement of the mobile device 325 through three dimensional space can be established by combining the outputs of the X-axis, Y-axis, and Z-axis accelerometers 629x, y, z using known methods. The GPS unit 623, the front image capture device 621, the back image capture device 627, and accelerometer array 629 may be referred to collectively as the "sensors" of the mobile device 325. Of course, it will be appreciated that additional GPS units 623, front image capture devices 621, back image capture devices 627, and/or accelerometer arrays 629 may be added to the mobile device 325 (and/or on-board computer 329).

The mobile device 325 may include a display interface for providing graphical data (e.g., image or video data) to a display device such as the display device 40. In an embodiment, the mobile device 325 does not include the display device 40.

The communication unit 625 may communicate with the server 351 via any suitable wireless communication protocol network, such as a wireless telephony network (e.g., GSM, CDMA, LTE, etc.), a Wi-Fi network (802.11 standards), a WiMAX network, a Bluetooth network, etc. The communication interface 625 may also be capable of communicating using a near field communication standard (e.g., ISO/IEC 18092, standards provided by the NFC Forum, etc.). Further, the communication interface 625 may use a wired connection to the server 351.

In an embodiment, the speaker 631 may be used to provide audio feedback in addition to or instead of the visual feedback provided via the display device 40. For example, the speaker 631 may provide audio in the form of natural language communication to notify a user of his or her driving skill progress, driving score, etc. The natural language communication may be in English, Spanish, or any other suitable language. In some embodiments, the speaker 631 may produce a non-linguistic sound to notify a user of improvement or regression.

The user-input device 633 may include a "soft" keyboard that is displayed on the display 40 of the mobile device 325, an external hardware keyboard communicating via a wired or a wireless connection (e.g., a Bluetooth keyboard), an external mouse, or any other suitable user-input device. The user-input device 633 may also include a microphone capable of receiving user voice input.

6.1. Controller 611

The controller 611 includes a processor 641 communicatively connected, via a link 649, to one or more of: a memory 643 (e.g., a random-access memory), a memory 645 (e.g., a program memory), and/or an I/O interface 647. The link 649 may be a system bus. The program memory 645 includes an operating system 661, a data storage 663, a plurality of software applications 665, and a plurality of software routines 667.

As discussed with reference to the controller 611, it should be appreciated that although FIG. 6 depicts only one processor/microprocessor 641, the controller 611 may include multiple processors/microprocessors 641. Similarly, the memory of the controller 611 may include multiple RAMs 643 and/or multiple program memories 645. Although FIG. 6 depicts the I/O circuit 647 as a single block, the I/O circuit 647 may include a number of different types of I/O circuits. The controller 611 may implement the memory 643 and/or memory 645 as semiconductor memories, magnetically readable memories, and/or optically readable memories, for example.

The memory 645 may include data and/or instructions. For example, the memory 645 may include data and/or instructions for an OS 661, a data storage 663, software applications 665, software routines 667, client application 669, image capture routine 671, browser 673, accelerometer routine 675, and/or a browser 677.

The operating system 661, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc.

(now Hewlett-Packard Company), Microsoft Corporation, Research in Motion (RIM), and Nokia, respectively.

The data storage 663 may include data such as user profiles and preferences, application data for the plurality of applications 665, routine data for the plurality of routines 667, and other data necessary to interact with the server 613 through the digital network 615. In some embodiments, the controller 204 may also include, or otherwise be communicatively connected to, other data storage mechanisms (e.g., one or more hard disk drives, optical storage drives, solid state storage devices, etc.) that reside within the mobile device 325 and/or on-board computer 329.

The one or more processors 641 may be adapted and configured to execute any of one or more of the plurality of software applications 665 and/or any one or more of the plurality of software routines 667 residing in the memory 645, in addition to other software applications. One of the plurality of applications 665 may be a client application 669 that may be implemented as a series of machine-readable instructions for performing the various tasks associated with implementing the driver-evaluation system 100 as well as receiving information at, displaying information on, and transmitting information from the mobile device 325 and/or on-board computer 329.

The client application 669 may function as part of a stand-alone system or as part of a system wherein the front-end components 311 communicate with back-end components 313 as described with reference to FIG. 3. The client application 669 may include machine-readable instruction for implementing a user interface to allow a user to input commands to, and receive information from, the driver-evaluation system 100.

One of the plurality of applications 665 may be a native web browser 673, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 351 or other back-end components 313 while also receiving inputs from the user. Another application of the plurality of applications may include an embedded web browser 677 that may be implemented as a series of machine-readable instructions for receiving, interpreting, and displaying web page information from the servers 351 or other back-end components 313 within the client application 669.

One of the plurality of routines may include an image capture routine 671 that coordinates with the image capture devices 621, 627 to retrieve image data for use with one or more of the plurality of applications, such as the client application 669, or for use with other routines. Another routine in the plurality of routines may include an accelerometer routine 675 that determines the force and direction of movements of the mobile device 325 and/or on-board computer 329. The accelerometer routine 675 may process data from the accelerometer array 629 to determine a vector describing the motion of the mobile device 325 and/or on-board computer 329 for use with the client application 669. In some embodiments where the accelerometer array 629 has X-axis, Y-axis, and Z-axis accelerometers 629$x$, $y$, $z$, the accelerometer routine 675 may combine the data from each accelerometer 629$x$, $y$, $z$ to establish a vector describing the motion of the mobile device 325 and/or on-board computer 329 through three dimensional space. Furthermore, in some embodiments, the accelerometer routine 675 may use data pertaining to less than three axes, such as when determining when the vehicle 323 is braking.

A user may launch the client application 669 from the mobile device 325 and/or on-board computer 329, to access the server 351 to implement the driver-evaluation system 100. Additionally, the customer or the user may also launch or instantiate any other suitable user interface application (e.g., the native web browser 673, or any other one of the plurality of software applications 665) to access the server 613 to realize the driver-evaluation system 100.

The server 613 may further include a number of software applications. The various software applications are responsible for generating the data content to be included in the web pages sent from the web server 373 to the mobile device 325 and/or on-board computer 329. The software applications may be executed on the same computer processor as the web server application 373, or on different computer processors.

In embodiments where the mobile device 325 and/or on-board computer 329 is a thin-client device, the server 351 may perform many of the processing functions remotely that would otherwise be performed by the mobile device 325 and/or on-board computer 329. In such embodiments, the mobile device 325 and/or on-board computer 329 may gather data from its sensors as described herein, but instead of analyzing the data locally, the mobile device 325 and/or on-board computer 329 may send the data to the server 351 for remote processing. The server 351 may perform the analysis of the gathered data to evaluate the driving performance of the driver 321 as described below. If the server 351 determines that the driver 321 may be impaired, the server 351 may command the mobile device 325 and/or on-board computer 329 to alert the driver 321 as described below. Additionally, the server 351 may generate the metrics and suggestions described below based on the gathered data.

7. An Example Method for Displaying a Report/GUI

Figure 7:
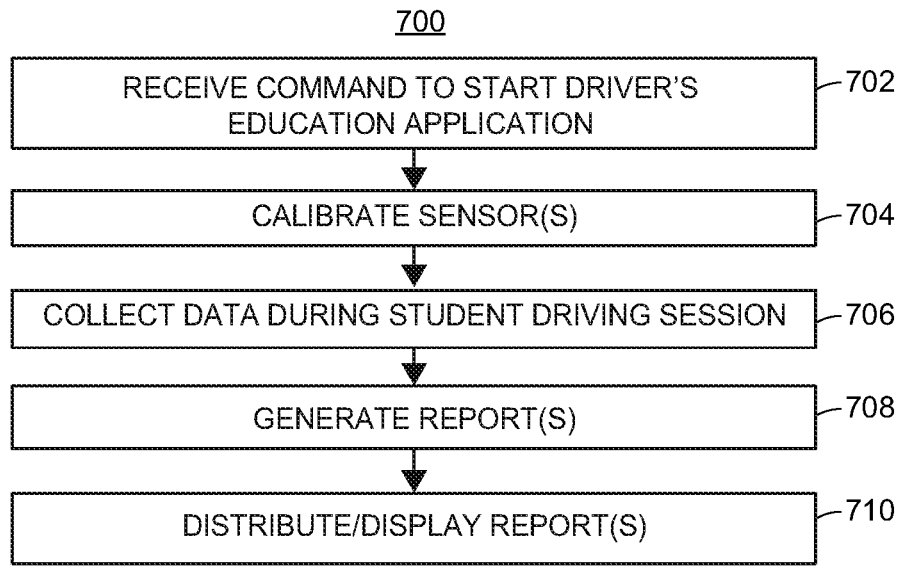
FIG. 7 is a flow diagram depicting an example method for displaying a driver evaluation report/GUI according to an embodiment.

FIG. 7 is a flow diagram depicting an example method 700 for displaying a driver evaluation report/GUI, such as the GUI 411 shown in FIG. 4, according to an embodiment.

The method 700 may be implemented by the driver-evaluation system 100 shown in FIG. 1B and/or the driver-evaluation system 300 shown in FIG. 3. More particularly the method 700 may be performed by: the mobile device 325, the on-board computer 329, the server 351, or some combination thereof. The method 700 may be saved as a set of instructions, routines, programs, or modules at computer readable media found, for example, in memory devices accessible by the driver-evaluation system 100. For example, some or all of the method 700 may be saved as the progress module 139 described with reference to FIG. 1B. While the method 700 is described with reference to the driver-evaluation system 100 (shown in FIG. 1B), the driving-monitor system 30 (shown in FIG. 1B), and the mobile device 325 (shown in FIG. 3 and FIG. 6), the method 700 may be implemented according to other embodiments.

The method 700 may be initiated by a command (block 702). The command may be a user command received by the mobile device 325 and/or on-board computer 329 via the client application 669 (shown in FIG. 6). Alternatively or additionally, the command may be sent by the server 351 or may be generated automatically by the mobile device 325 and/or on-board computer 329 after the meeting of a condition (e.g., the vehicle 323 has been started; the mobile device 325 is within a specified distance from the vehicle, a certain time, etc.).

Next, the sensors (e.g., sensors 61, which may include sensors of the mobile device 325 and/or of the on-board computer 329) may be calibrated (block 704). For example, a GPS unit, an accelerometers, a compass, a gyroscope, an image capture device, and/or other sensors may be activated and/or calibrated.

For example the front image capture device 621 may attempt to detect the face and eye(s) of the driver 321. Calibration may further entail adjusting the front image capture device 621 to account for the driver's 321 skin tone, facial characteristics, etc., ambient light in the vehicle, the background behind the driver 321, etc. The back image capture device 627 may also be calibrated, such as, to attempt to detect the road in front of the vehicle, identify lane markings, and identify other vehicles on the road. Calibration may further entail adjusting the back image capture device 627 to account for the color of the road, road conditions (e.g., a wet road from rain or an icy road from snow), the color of lane markings, the time of day and ambient light, etc. The accelerometer array 629 may also be calibrated. Such calibration may include accounting for constant vibration (e.g., the vibration caused by the engine of the vehicle 321) or other repetitive forces applied to the mobile device 325 and/or on-board computer 329.

After calibration, the mobile device 325 and/or on-board computer 329 may begin to collect data about driver performance using the sensor(s) 61 (shown in FIG. 1B and FIG. 6) (block 706).

8. Example Methods for Logging a Driving Session

Figure 8:
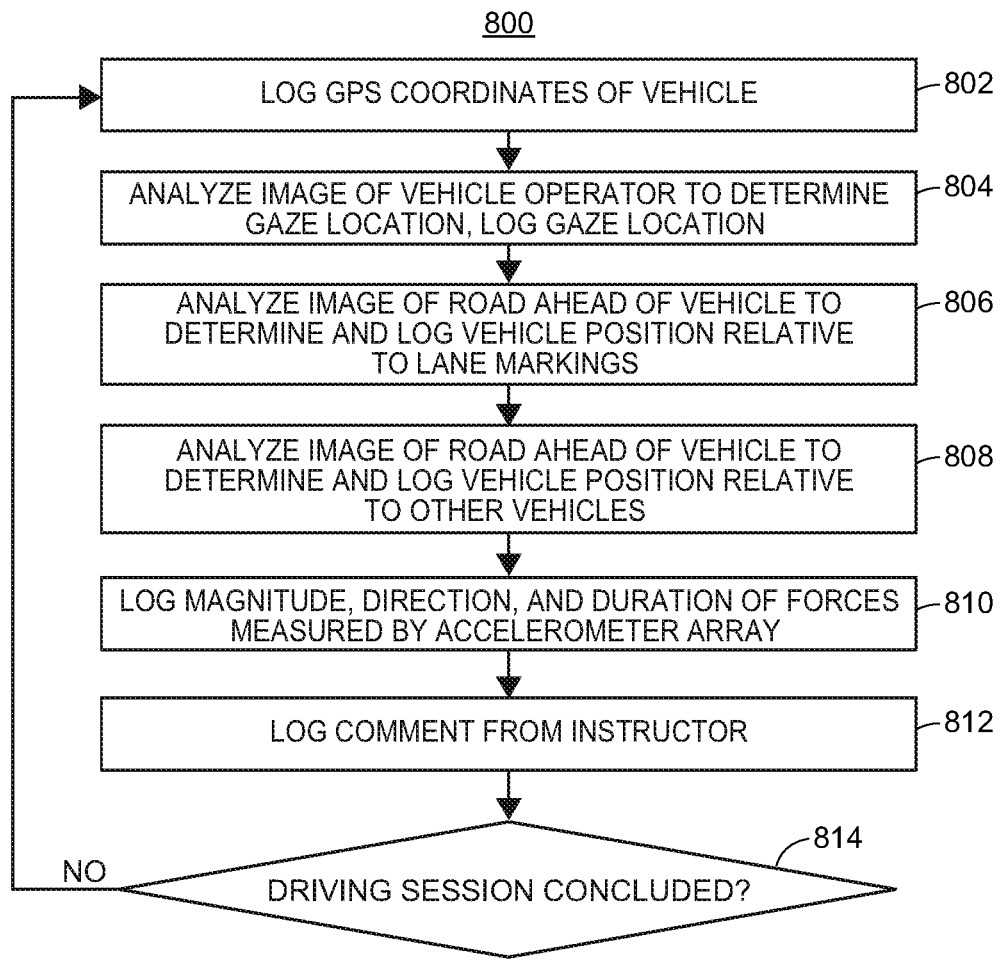
FIG. 8 is a flow diagram depicting an example logging method according to an embodiment.
Figure 9A:
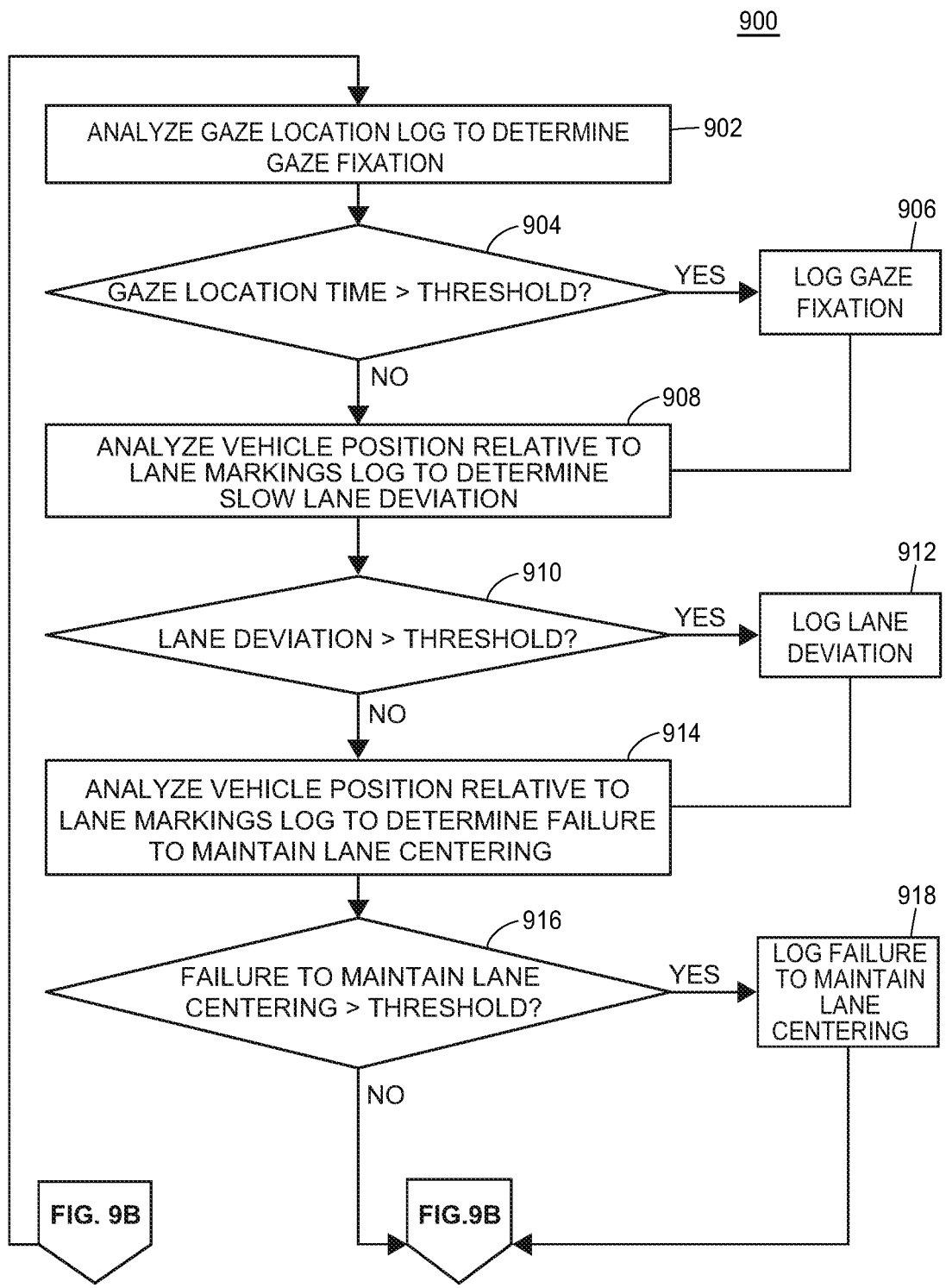
FIG. 9A is a flow diagram depicting an example logging method according to an embodiment.
Figure 9B:
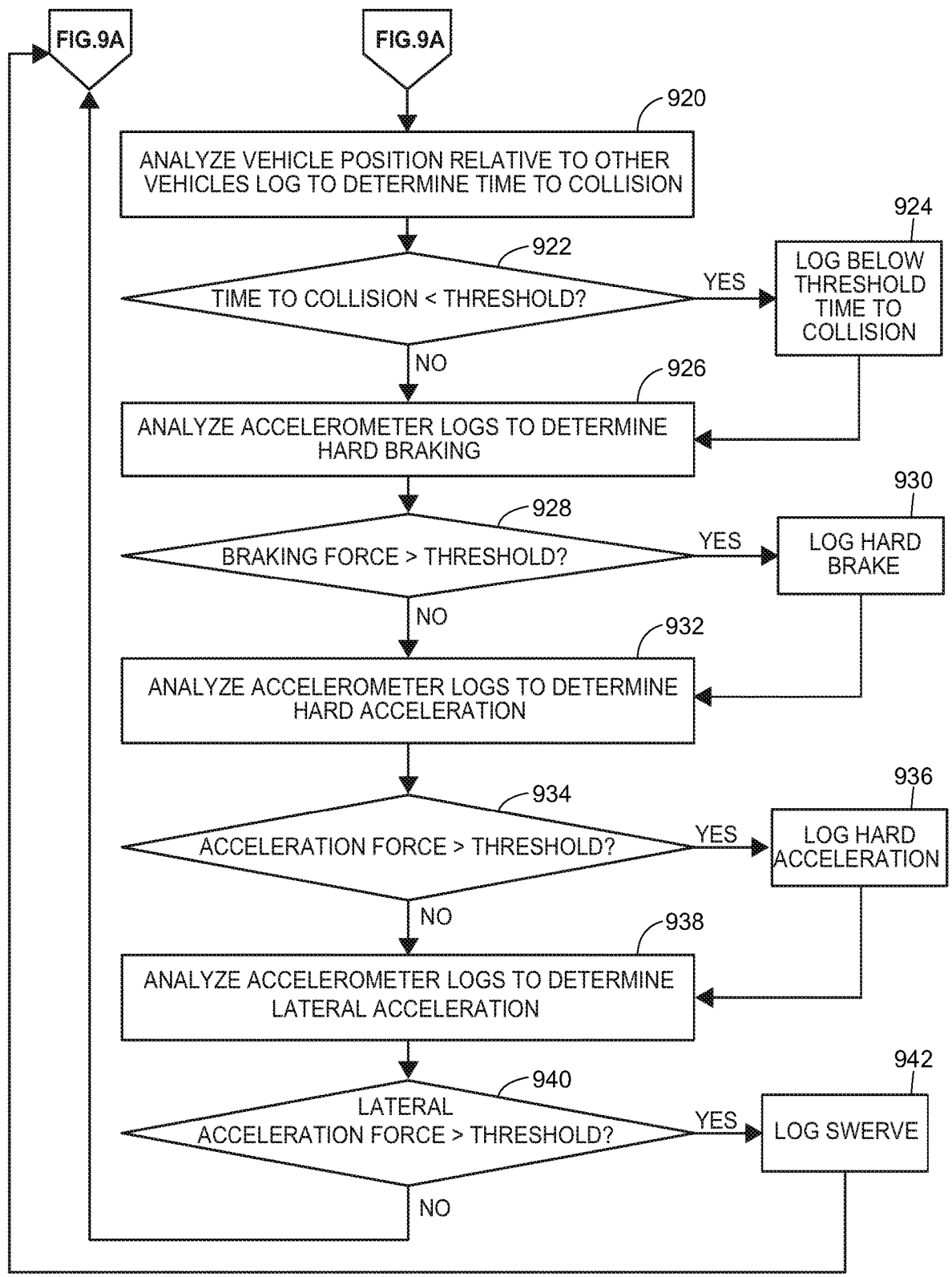
FIG. 9B is a flow diagram depicting an example logging method according to an embodiment.

FIGS. 8, 9A, and 9B are flow diagrams depicting example logging methods 800 and 900 according to an embodiment. The methods 800 and/or 900 may be implemented by the driver-evaluation system 100 (shown in FIG. 1) or driver-evaluation system 300 (shown in FIG. 3) while gathering data about driver performance (see, e.g., block 706 shown in FIG. 7). It will be understood that in some embodiments, one or more of the steps in method 800 and/or 900 are not implemented.

8.1. Example Method 800 for Logging Movement-Data and Other Data

Performance indicators may be a series of measurements of conditions or characteristics pertaining to driver performance. Accordingly, sensors 61 (e.g., the front image capture device 621, back image capture device 627, and/or accelerometer array 629) may be used to measure these conditions and characteristics. Such measurements may be logged periodically (e.g., every millisecond, every second, etc.) or may be logged conditionally on the occurrence of an event (e.g., a force of a magnitude above a certain threshold is detected) and stored in data storage 663 as a performance indicator log. Such performance indicator logs may also include a timestamp to note the time of the measurement and/or a location stamp to note the GPS coordinates of the measurement.

The driver-evaluation system 100 may make performance indicator logs for primary performance indicators such as driver gaze location and vehicle movement (e.g., vehicle position relative to lane markings, vehicle position relative to other vehicles; and acceleration along the X, Y, or Z axes). The driver-evaluation system 100 may derive secondary performance indicators from the primary performance indicators such as: driver gaze fixation, lane deviation, failure to maintain lane centering, time to collision, time to brake, time to react, longitudinal vehicle control, vehicle braking, vehicle acceleration, and lateral acceleration. Both the primary performance indicator logs and secondary performance indicator logs may be logged separately (e.g., a log for gaze location, a log for X axis force, etc.) or may be logged together. These separate or integrated logs may be stored in data storage 669 or may be transmitted to the server 351 via the network 341 for remote storage. In an embodiment, the primary and/or secondary performance indicators are logged at the performance log 135 shown in FIG. 1B.

8.1(A) Log GPS Coordinates

In an embodiment, the driver-evaluation system 100 may receive GPS coordinates from a GPS receiver. In particular, the driver-evaluation system 100 may include a location stamp for each performance log that may be recorded by taking a reading from the GPS unit 623 (which may be included in the mobile device 325, the on-board computer 329, or another device) to determine current location of the vehicle 321 (block 802). As discussed above, a location stamp may be recorded for each performance log. Accordingly, it may be advantageous to take a reading from the GPS unit 623 prior to recording any performance log. Additionally, with a series of GPS location logs, the velocity of the vehicle 321 may be determined. Further, if speed limit data about the route taken is available, a series of GPS location logs and a calculated velocity may be used to make a determination about whether the driver 321 is maintaining a speed above a minimum speed limit and/or below a maximum speed limit. In some embodiments, GPS coordinates are not collected.

8.1(B) Log Gaze Location

In an embodiment, driver gaze location may be determined by monitoring the eye or eyes of driver 321 with the front image capture device 621 (block 804). Driver gaze location may be logged as the horizontal and vertical coordinates of the driver's apparent gaze. Driver gaze location may be used to determine when the driver 321 is looking at the road, mirrors, the dashboard, stereo or air conditioning controls, a mobile device, etc. In some embodiments, the client application 669 may log whether the driver 321 is looking at a distraction (e.g., the stereo) or in the direction of an important area for vehicle operation (e.g., the road, mirrors, etc.).

The driver-evaluation system 100 may differentiate between the important areas for vehicle operation in gaze location logs. The driver-evaluation system 100 may include a first value in the gaze location log indicating that the driver was looking at the road, a second value in the gaze location log indicating that the driver was looking at the rear view mirror, a third value in the gaze location log indicating that the driver was looking at the left side mirror, a fourth value in the gaze location log indicating that the driver was looking at the right side mirror, and a fifth value in the gaze location log indicating that the vehicle was looking at the dashboard gauges (e.g., speedometer). The client application 669 may also include a timestamp and/or location stamp in the gaze location log. If a gaze location log is made every time the driver starts looking at a different object, then the duration of a particular driver gaze can be determined by the difference between the time the driver 321 began looking at the object and the time the driver 321 begins looking at another object. In some embodiments driver gaze location is not determined.

8.1(C) Log Vehicle Position

The back image capture device 627 may be used to monitor conditions on the road including identifying lane markings and/or other vehicles on the road. Vehicle position relative to lane markings may be determined by processing an image or series of images captured by the back image capture device 627 to determine the distance of the vehicle 321 from lane markings on either or both sides of the vehicle 321 (block 806). The mobile device 325 and/or on-board computer 329 may determine vehicle position relative to lane markings regularly with a timestamp and/or location stamp and store the log of vehicle position relative to lane markings in data storage 669 or send the log of vehicle position relative to lane markings to the server 351 for remote storage.

Similarly, vehicle position relative to other vehicles (also referred to as vehicle headway distance) may be determined by processing an image or series of images captured by the back image capture device 627 to determine the distance of the vehicle 321 from other vehicles on the road in front of the vehicle 321 (block 808). For example, the images captured by the back image capture device 627 may be analyzed to compare the visual area of an object in front of the vehicle in one or more images (i.e., if the visual area is larger in a first image relative to a second image, the object was likely closer at the time the second image was captured whereas if the visual area of the object is smaller in a first image relative to a second image, the object was likely further away at the time the second image was captured) and/or the visual area of the road between the vehicle 321 and an object (i.e., if the visual area of the road is larger in a first image relative to a second image, the object was likely further away at the time the second image was captured whereas if the visual area of the road is smaller in a first image relative to a second image, the object was likely closer at the time the second image was captured). Additionally or alternatively, if the back image capture device 627 is properly calibrated, a single image of the road ahead of the vehicle may be sufficient to estimate the distance of the vehicle 321 from the vehicle ahead using known trigonometric principles. The mobile device 325 and/or on-board computer 329 may determine vehicle position relative to other vehicles regularly with a timestamp and store the log in data storage 669 or send the log to the server 351 for remote storage. Additionally, information from the GPS unit 623 may be incorporated into the log to add information about the current velocity and/or location of the vehicle 321.

8.1(D) Log Movement-Data

The accelerometer array 629 may be used to monitor forces on the vehicle in the X, Y, and/or Z axis and create accelerometer logs (block 810). In some embodiments, the Y-axis may be oriented along left to right axis of the mobile device 325 and/or on-board computer 329, the Z-axis may be oriented along the top to bottom axis of the mobile device 325 and/or on-board computer 329, and the X-axis may be oriented along the front to back axis of the mobile device 325 and/or on-board computer 329. However, the axes could be oriented in any number of ways. The mobile device 325 and/or on-board computer 329 may determine the magnitude of a force along one of the axes and make an accelerometer log with a timestamp and/or location stamp in data storage 669 or send the accelerometer log to the server 351 for remote storage.

8.1(E) Receive User Input

In an embodiment, the user input device 633 may be used to collect comments from the driving instructor during the driving session (block 812). By activating a control, a user may create a comment or note about the driving session. The user may record an audible comment or type a textual comment. For example, a driving instructor may make a comment after instances of poor driving performance such as the driver 321 stopping in a crosswalk, crossing the center line of the street, applying the brakes too late, etc. The driving instructor may also make comments after instances of good driving performance such as a well-executed turn. The comments may be related to a particular action (e.g., a particularly well executed turn) or general comments about the driving session (e.g., "Sam has shown a marked improvement since the session last week."). The instructor may make notes during and/or after the driving session. Comments may be entered by the instructor directly on the first mobile device 325 and/or on-board computer 329 performing the driver performance evaluation methods discussed herein, or comments may be entered via a second mobile device 325 in communication with the first mobile device 325 and/or on-board computer 329. For example, the driving instructor may use a tablet computer to record comments which are relayed to the first mobile device 325 and/or on-board computer 329 via Bluetooth® or Near Field Communication or any known short-range networking technique. Alternatively, the second mobile device 325 may communicate with the first mobile device 325 and/or on-board computer 329 via the network 341. The comments may be stored with a timestamp and/or location stamp in data storage 669 or sent to the server 351 for remote storage If the driver session has concluded, the logging method 800 may end. However if the student driving session has not concluded, the primary performance indicator logging method 400 may continue to gather data (block 414).

8.2. Example Method 900 for Logging Performance Indicators

In an embodiment, secondary performance indicators may be determined and logged based on an analysis of primary performance indicators. For example, movement of the driver 321 may be determined from movement-data received from sensors 61, and may be analyzed to identify safe or unsafe movements, for example. These unsafe movements may be logged as secondary performance indicators. Secondary performance indicators may include gaze fixation, lane deviation and/or centering, time-to-collision metrics, hard braking events, hard acceleration events, and/or vehicle swerving.

8.2(A) Gaze Fixation

Referring to FIG. 9A, driver gaze fixation may be determined by analyzing a set of driver gaze location logs and determining the length of time in which the driver 321 is looking at a particular place (block 902). It will be understood that when looking at a particular place, a driver 321 may move his or her eyes slightly. Such minor variations may be disregarded subject to a sensitivity setting.

Driver gaze fixation records instances where a driver has looked at the same object for more than a threshold period of time (e.g., 100 ms) (block 904). For example, driver gaze fixation may be used to detect when the driver 321 has his or her gaze fixed on the road above a threshold level (e.g., the driver 321 has not looked at mirrors or dashboard in more than two seconds). Additionally or alternatively, driver gaze fixation may be determined by analyzing a set of driver gaze location logs and determining the eye movement of the driver 321 by calculating the degree to which the driver's 321 eyes have moved in a first image relative to a second image. When employing such an eye movement velocity-based gaze detection algorithm, driver gaze fixation may record instances where the velocity of eye movement is below a threshold value (e.g., thirty-five degrees per second).

If driver gaze fixation is detected, the client application 669 may make a gaze fixation log with a timestamp and/or location stamp (block 906).

8.2(B) Lane Deviation

With the logs of vehicle position relative to lane markings, lane deviation may be determined by analyzing the logs of vehicle position relative to lane markings to determine when the distance between a lane marking and vehicle 321 indicates that the vehicle 321 has changed lanes (block 908). While lane changes are a normal aspect of vehicle operation, a slow lane change may indicate that the operator 106 is not properly controlling the vehicle 321 and/or is distracted.

Accordingly, the driver-evaluation system 100 may analyze the log of vehicle position relative to lane markings to detect lane changes that occur over a period of time greater than a threshold value (e.g., twenty seconds, thirty seconds, etc.) (block 910).

When a slow lane deviation is detected, the client application may make a slow lane deviation log with a timestamp and/or location stamp (block 912).

8.2(C) Lane Centering

With the logs of vehicle position relative to lane markings, failure to maintain lane centering may be determined by analyzing the logs of vehicle position relative to lane markings to determine when the distance between a lane marking and vehicle 321 indicates that the vehicle 321 is not centered in the lane (block 914). Similarly to lane deviation, if a vehicle 321 starts to veer from the center of the lane over a long period of time, this may indicate that the driver 321 is not properly controlling the vehicle 321 and/or is distracted.

Accordingly, the driver-evaluation system 100 may analyze the log of vehicle position relative to lane markings to detect an increasing failure to maintain lane centering that occurs over a period of time greater than a threshold value (e.g., fifteen seconds) (block 916).

When a failure to maintain lane centering is detected, the client application 669 may make a log with a timestamp and/or location stamp (block 918).

8.2(D) Time-to-Collision

Referring now to FIG. 9B, with the logs of vehicle position relative to other vehicles, time to collision may be determined by analyzing the logs of vehicle position relative to other vehicles to determine when a decreasing time to collision indicates that the vehicle 321 may be too close behind another vehicle (block 920). Time to collision may be calculated in a number of ways (e.g., by dividing the distance between the vehicle 321 and the vehicle ahead by the difference in velocity between the two vehicles, etc.).

For example, the client application 669 may determine the visual area of an object in front of the vehicle 321 in a first image, determine the visual area of the object in a second image, and calculate the difference between the two areas. Then, the time to collision may be estimated by noting the change in the difference between the two areas relative to the amount of time between the first time and the second time. Additionally or alternatively, the client application 669 may determine the visual area of the road in front of the vehicle 321 in a first image, determine the visual area of the road in a second image, and calculate the difference between the two areas. Then, the time to collision may be estimated by noting the change in the difference between the two areas relative to the amount of time between the first time and the second time. Alternatively, the distance between the vehicle 321 and the vehicle ahead may be calculated with a single image using trigonometry as discussed above. Input from the GPS unit 623 may be used to determine current velocity of the vehicle 321.

The driver-evaluation system 100 may analyze the log of vehicle position relative to other vehicles to detect when time to collision decreases below a threshold value (e.g., 2 second etc.), which may indicate, for example, that the driver 321 is tailgating the vehicle ahead (block 920).

When a below threshold time to collision is detected, the client application 669 may make a time to collision below threshold log with a timestamp and/or location stamp (block 922). Alternatively or additionally, the data used to calculate time to collision may also be used to calculate similar metrics such as time to brake (i.e., the amount of time the driver 321 has to apply the brakes in order to prevent collision with an object) and/or time to react (i.e., the amount of time a driver 321 has to recognize an imminent collision and react to prevent it by swerving and/or applying the brakes).

In addition to the data used to calculate time to collision, it may be advantageous to incorporate additional data into the calculation of time to brake and time to react such as the stopping capability of the vehicle 321, road conditions (e.g., wet, icy, unpaved, etc.), and the reaction time of the driver 321 (e.g., determined by a test performed on the individual driver 321, calculated by adjusting average human reaction time to account for the driver's 321 age, health, performance level as determined herein, etc.). As with time to collision, time to brake and/or time to react may be compared to a threshold time and used to generate a performance log.

8.2(E) Hard Braking

With the accelerometer logs, vehicle braking or deceleration may be monitored by noting deceleration sensed by an accelerometer oriented in the fore-aft direction of the vehicle (i.e., the X-axis) (block 926). If the force measured by the accelerometer array 629 indicates that the brakes of the vehicle 321 have been applied sharply (e.g., the force measured in the X-axis exceeds a threshold value) (block 928), the client application 669 may make a hard brake log with a timestamp and/or location stamp (block 930).

8.2(F) Aggressive Acceleration

With the accelerometer logs, vehicle acceleration may be monitored by noting acceleration sensed by an accelerometer oriented in the fore-aft direction of the vehicle (i.e., the X-axis) (block 932). If the force measured by the accelerometer array 629 indicates that the accelerator of the vehicle 321 has been applied sharply (e.g., the force measured in the X-axis exceeds a threshold value) (block 934), the client application 669 may make a sharp acceleration log with a timestamp and/or location stamp (block 936).

8.2(G) Swerving

With the accelerometer logs, vehicle lateral acceleration may be monitored by analyzing forces measured by an accelerometer oriented along the left to right side of the vehicle 321 (i.e., the Y-axis) (block 938). If the force measured by the accelerometer array 629 indicates that the vehicle 321 has swerved (e.g., the force measured in the Y-axis exceeds a threshold value) (block 940), the client application 669 may make a swerve log with a timestamp and/or location stamp (block 942).

In embodiments where the mobile device 325 and/or on-board computer 329 is a thin client device, the mobile device 325 and/or on-board computer 329 may send the logs to the server 351 soon after logging the recorded information. In such embodiments, the server 351 may analyze the logs of primary performance indicators as discussed above to determine secondary performance indicators.

Referring again to FIG. 7, after gathering primary and secondary performance indicators, the driver-evaluation system 100 may analyze the primary and secondary performance indicators to generate one or more reports or GUIs about the driving session (see, e.g., block 708 shown in FIG. 7).

Figure 10:
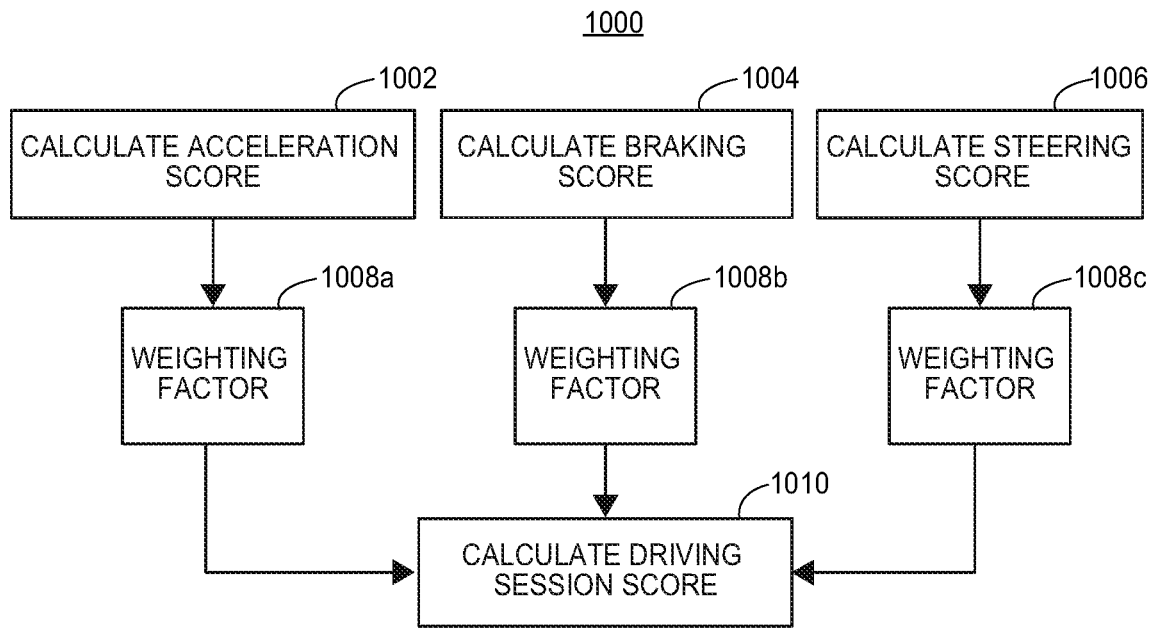
FIG. 10 illustrates an example method for calculating a driving score according to an embodiment.
Figure 11:
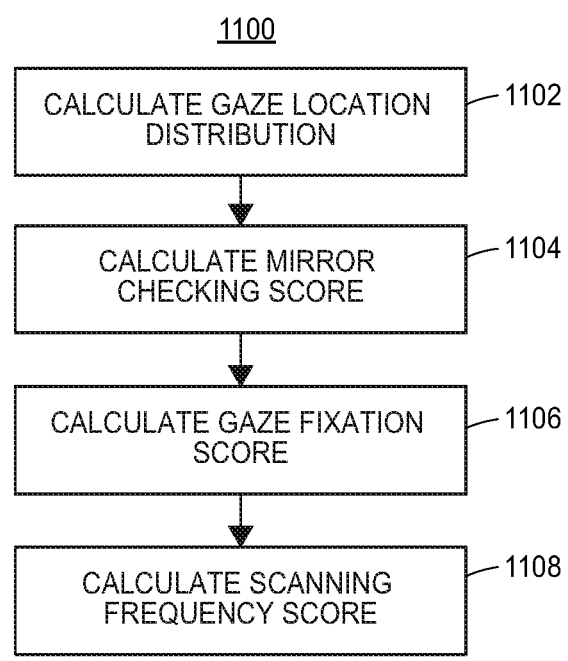
FIG. 11 depicts an example method for calculating a driver scanning score according to an embodiment.

Generating the one or more reports or GUIs may include generating individual skill performance score(s) for the driving session for one or more of a gaze location score, a scanning frequency score, a gaze location score, a lane deviation score, a lane centering score, a time to collision score, a braking score, an acceleration score, or a steering score. Additionally or alternatively, the report or GUI may include one or more composite score(s) calculated using the individual skill performance score(s) that were generated. FIGS. 10 and 11 describe examples of how various individual skill performance scores and composite scores may be generated in exemplary embodiments.

Further, the report(s) or GUI(s) generated may include a recitation of important events that occurred during the driving session such as braking, acceleration, and/or swerving with forces exceeding a safety threshold (e.g., a hard brake at the intersection of Clark St. and Division St., a hard right turn at the intersections of LaSalle St. and Ohio St., etc.) with a timestamp and/or location stamp. The report may also include any comments made by the driving instructor during and after the driving session. It may be advantageous to represent these important events and comments visually on a map.

After the report(s)/GUI(s) have been generated, they may be distributed and/or displayed (see, e.g., block 710 shown in FIG. 7). The report(s) may be distributed via email or other type of electronic messaging to the driving instructor, the driver, and/or the parents of the driver. The report(s)/GUI(s) may also be displayed on a display of the mobile device 325 and/or on-board computer 329 or any other computing device being used by one or more of the driver, parents, and driving instructor. Additionally, it may be advantageous to prepare a printed version of the report(s) and/or generate automated voicemail messages, and using known techniques.

9. Example Methods for Score Calculation

FIG. 10 illustrates an example method 1000 for calculating a driving score according to an embodiment. FIG. 11 depicts an example method 1100 for calculating a driver scanning score according to an embodiment. The methods 1000 and 1100 may be implemented, in whole or in part, by the driver-evaluation system 100 (shown in FIG. 1B), the driving-monitor system 30 (shown in FIG. 1B), the driver-evaluation system 300 (shown in FIG. 3), and/or the driving-monitor system 330 (shown in FIG. 3). Thus, it will be understood that while the methods 1000 and 1100 are generally described with reference to the driver-evaluation system 100 and the driving-monitor system 30, the methods 1000 and 1100 may also be implemented by the driver-evaluation system 300 and the driving-monitor system 330.

The methods 1000 and 1100 may be saved as a set of instructions, routines, programs, or modules at computer readable media found, for example, in memory devices accessible by the driver-evaluation system 100. For example, some or all of the methods 1000 and/or 1100 may be saved as the progress module 139 described with reference to FIG. 1B. In an embodiment, the methods 1000 and/or 1100 may be saved, in whole or in part, as a module distinct from the progress module 139.

9.1. Method 1000 for Calculating a Driving Score

In an embodiment, the method driver-evaluation system 100 begins when an acceleration score is determined (block 1002). For example, the driving-monitor system 30 may determine an acceleration score using one or more performance logs 135. As an example, an acceleration score may be determined by subtracting points from a total score of 100 every time a driver applies too much acceleration during the driving session. The number of points subtracted may be determined according to a series of threshold values. For example, 1 point may be subtracted for a "hard" acceleration (e.g., acceleration above threshold A1 $m/s^2$), 2 points may be subtracted for a "very hard" acceleration (e.g., acceleration above threshold A2 $m/s^2$), and 3 points may be subtracted for a "severe" acceleration (e.g., acceleration above threshold A3 $m/s^2$).

In an embodiment, a braking score may also be determined (block 1004). For example, the driving-monitor system 30 may generate or determine a braking score using one or more performance logs 135. A braking score may be determined by subtracting points from a total score of 100 every time the driver 321 applies too much braking (or deceleration) during the driving session. The number of points subtracted may be determined according to a series of threshold values. For example, 1 point may be subtracted for a "hard" braking (e.g., braking above threshold B1 $m/s^2$), 2 points may be subtracted for a "very hard" braking (e.g., braking above threshold B2 $m/s^2$), and 3 points may be subtracted for a "severe" braking (e.g., braking above threshold B3 $m/s^2$).

Further, in an embodiment a steering score may be determined (block 1006). For example, the driving-monitor system 30 may determine a steering score using one or more performance logs 135. The number of points subtracted may be determined according to a series of threshold values. For example, 1 point may be subtracted for a "hard" turning (e.g., turning above threshold T1 $m/s^2$), 2 points may be subtracted for a "very hard" turning (e.g., turning above threshold T2 $m/s^2$), and 3 points may be subtracted for a "severe" turning (e.g., turning above threshold T3 $m/s^2$). Of course, it will be understood that for each score different numbers of points may be subtracted and different units may be used. Further, it will also be understood that the scores may be calculated using methods other than subtraction from 100 such as adding points to a store for every acceleration, brake, and/or turn that does exceed the thresholds discussed above.

After determining various scores or sub-scores (e.g., for acceleration, braking, and steering as discussed above) weighting factors may be applied (blocks 1008a-1008c). In particular, the driving-monitor system 30 may multiply each score by a weighting factor. For example, if each score is weighted equally, the weighting factors may all be .333. However, it may be advantageous to weight one score higher than another. For example, sharp acceleration may be less important than braking and steering in evaluating the performance of the driver. In such an embodiment, the weighting factors may be 0.25, 0.35, and 0.40, respectively. In some embodiments, the weighting factors may be adjusted based on previous data for the user or for a large group of users. The weighting factors may be adjusted by one of the many known learning algorithms such as a support vector machine (SVM).

The driving-monitor system 30 may sum the weighted scores to determine a composite driving session score (block 1010). The composite driving session score may be logged in with a timestamp and stored to memory (e.g., the memory 133 shown in FIG. 1B) and/or sent to the server 351 for remote storage. Alternatively, it will be understood that instead of a weighted sum adding up to a composite driving session score, the client application 669 may instead be a weighted sum that is subtracted from a maximum composite driving session score.

In an embodiment, the composite driving session score is determined, at least in part, based on other scores instead of or in addition to the scores described above. For example, the composite driving session score may be determined, at least in part, based on a driver scanning score (described with reference to FIG. 11).

While the exemplary embodiment discussed above uses a 100 point scale, it will be appreciated that a 100 point scale is just one of many point scales that could be used (e.g., 50 point scale, 200 point scale, 500 point scale, 1000 point scale, etc.). Additional primary and secondary performance indicators may be used in the determination of the composite driving session score. For example, a gaze location score, a scanning frequency score, a gaze location score, a lane deviation score, a lane centering score, or a time to collision score may be added to the calculation of the composite driving session score. Each primary and secondary performance indicator may be used to generate a respective score similar to the scores described in connection to FIG. 10.

For example, a respective score for each may be calculated by subtracting 1 point from a total score of 100 for every instance of a gaze fixation, slow lane deviation, failure to maintain lane centering, below threshold time to collision, respectively. Once a score for some or all of the gaze fixation, slow lane deviation, failure to maintain lane centering, below threshold time to collision performance has been calculated, scores may be added to the weighted sum discussed above. It will be appreciated that when additional scores are added to the weighted sum, it may be advantageous to change the weighting coefficient for some or all of the other scores in the weighted sum. Additionally, the driving-monitor system 100 may be configurable to adjust sensitivity, change point deduction values, etc.

9.2. Method 1100 for Calculating a Driver Scanning Score

In an embodiment, the method 1100 begins when a gaze location distribution is calculated (block 1102). In particular, the driving-monitor system 30 may determine a gaze location distribution using the gaze locations logs (which may, e.g., be saved as part of the performance log(s) 135 shown in FIG. 1B). Because each gaze location log may include geographic coordinates corresponding to where the driver 321 was looking at a particular time during the driving session, it may be advantageous to group the gaze location logs according to their coordinates. For example, it is likely that many gaze location logs were made when the driver 321 was looking at one of the mirrors or the road ahead. Thus, even without knowledge of the interior layout of the vehicle 321, the method 1100 may enable the driver-evaluation system 100 to determine where important features of the vehicle 321 are located based on the statistical distribution of gazes. A significant number of gazes to the far right may correspond to the right side mirror, a significant number of gazes to the upper center may correspond to the rear view mirror, etc. Accordingly, the method 1100 may enable the driver-evaluation system 100 to sort the gaze location logs into groups for right side mirror gazes, left side mirror gazes, rear mirror gazes, road gazes, and other gazes. The driver-evaluation system 100 may implement the method 1100 to total the amount of time the driver 321 was looking at each location and determine an average amount of time the eyes of the driver 321 were not focused on the road ahead.

Using the gaze location distribution, a mirror checking score may be calculated (block 1104). The mirror checking score may be determined (e.g., by the driver-evaluation system 100) by comparing the amount of time during the driving session that the driver 321 spent gazing at the right side mirror, left side mirror, and rear view mirror to an expected amount of time. The expected amount of time may be a threshold level established by, for example, observing good drivers to determine how often each of the good drivers gaze at each mirror over a period of time (e.g., looking at each mirror for 0.5 second every 30 seconds). The mirror checking score may be calculated by subtracting points from 100 every time the driver 321 fails to look at each mirror periodically at the expected amount during the driving session. Alternatively, using a dataset of driving performances by a large number of drivers (e.g., other drivers that have used the systems and methods described herein in the past), the driver-evaluation system 100 may calculate a distribution of mirror checking performance. Using this distribution, the method 1100 may calculate in which percentile the performance of the driver 321 belongs, and store that percentile as the mirror checking score.

In an embodiment, a gaze fixation score may be calculated (block 1106). The gaze fixation score may be determined (e.g., by the driver-evaluation system 100) by subtracting 1 point from a total score of 100 every time gaze fixation is detected during a certain period of time. As with the mirror checking score discussed above, using a dataset of driving performances by a large number of drivers (e.g., other drivers that have used the systems and methods described herein in the past), the driver-evaluation system 100 may calculate a distribution of gaze fixation performance. Using this distribution, the driver-evaluation system 100 may implement the method 1100 to calculate in which percentile the performance of the driver 321 belongs, and store that percentile as the gaze fixation score.

In some embodiments, a scanning frequency score may be calculated (e.g., by the driver-evaluation system 100) (block 1108). The scanning frequency score may be calculated using one or more performance logs 135. A scanning frequency score can be determined by subtracting 1 point from a total score of 100 every time the driver 321 fails to shift his or her gaze from one important area for vehicle operation (e.g., the road, mirrors, etc.) to another important area for vehicle operation within a threshold period of time (e.g., 5 seconds) within a certain period of time. For example, a driver 321 who is distracted may not look from the road to check the mirrors and speed indicator with sufficient frequency. As with the mirror checking score discussed above, using a dataset of driving performances by a large number of drivers (e.g., other drivers that have used the systems and methods described herein in the past), the driver-evaluation system 100 may calculate a distribution of scanning frequency performance. Using this distribution, the driver-evaluation system 100 may implement the method 1100 to calculate in which percentile the performance of the driver 321 belongs, and store that percentile as the scanning frequency score. Each score may be logged in with a timestamp and stored, e.g., in data storage at the mobile device 325 or on-board computer 329, and/or sent to the server 351 for remote storage.

10. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

10.1. Network(s)

As used herein, unless otherwise specified, the term "network" is a collection of nodes (e.g., devices or systems capable of sending, receiving and/or forwarding information) and links which are connected so as to enable telecommunication between the nodes.

Generally speaking, the term "node" refers to a connection point, redistribution point, or a communication endpoint. A node may be any device or system (e.g., a computer system) capable of sending, receiving and/or forwarding information. For example, end systems that originate and/or ultimately receive a message are nodes. Intermediary device that receive and forward the message are also generally considered to be "nodes."

A "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as communication channel. In particular, in a wireless communication system a channel generally refers to a particular frequency or frequency band. A carrier signal (or carrier wave) is transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

As already noted, a network is a collection of nodes and links. A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or subnetworks, such as a local area network (LAN) or a wide area network (WAN).

10.2. Communication Interface(s)

Some of the devices and systems described herein include a "communication interface" (sometimes referred to as a "network interface"). A communication interface of a system enables the system to send information to other system and/or receive information from other systems. In some instances, a communication interface of a system may be utilized to establish a direct connection to another system. In some instances, a communication interface of a system enables the system to connect to a network (via a link).

To illustrate, a communication interface can include circuitry for permitting wireless communication (e.g., short-range and/or long-range communication) with one or more devices or systems using any suitable communications protocol. For example, a communication interface may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/IP") (e. g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. A communication interface of a system may also include circuitry that enables the system to be electrically coupled to another device and communicate with that other device.

10.3. Hardware and Software System(s)/Module(s)

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules/systems/subsystems of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

10.4. Processor(s)

The various operations of example methods described herein may be performed, at least partially, by one or more processors. Such processors may be configured to fetch and execute instructions stored to memory. By executing these instructions, the processor can carry out various operations or functions.

The processors may be temporarily configured (e.g., by instructions or software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

10.5. Memory and Computer-Readable Media

Generally speaking, as used herein the phrase "memory device" may refer to any system or device including computer-readable media ("CRM"), which may be any available media accessible by the relevant computing system for placing, keeping, and/or retrieving information (e.g., data, computer-readable instructions, program modules, etc). The CRM may be implemented in any technology, device, or group of devices included in the relevant computing system or in communication with the relevant computing system. The CRM may include both volatile and nonvolatile media, and removable and non-removable media. The CRM may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is a circuit that manages the flow of data between the CRM and the system bus.

10.6. System Bus(es)

Generally speaking, a processor or a particular system or subsystem may communicate with other components of the system or subsystem via one or more communication links. When communicating with components in a shared housing, for example, the processor may be communicatively connected to the components by a system bus. Unless stated otherwise, as used herein the phrase "system bus" refers to: a data bus (for carrying data), an address bus (for determining where the data should be sent), a control bus (for determining the operation to execute), or some combination thereof. Further, "system bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

10.7. Data/Information Generation and Manipulation

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

10.8. Embodiments

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

10.9. Relational and Logical Expressions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although this detailed description contemplates various embodiments, it should be understood that the legal scope of the invention is defined by the words of the claims set forth at the end of this patent. This detailed description is to be construed as exemplary only and does not describe every possible embodiment, as describing every possible embodiment would be impractical, if not impossible. One could implement numerous alternate embodiments, using either current technology or technology developed after the filing date of this patent, which may fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims of this patent is referred to in this patent in a manner consistent with a single meaning, that is done for sake of clarity only so as to not confuse the reader, and it is not intended that such claim term be limited, by implication or otherwise, to that single meaning.

What is claimed:

1. A driver evaluation system for evaluating progress of a driver's skill level, the driver evaluation system comprising:
   (A) a driving-monitor system including:
     (i) a GPS unit or an accelerometer that generates movement-data based upon a detected movement of a vehicle;
     (ii) a processor that:
       (a) generates, based upon the generated movement-data, a first driving skill score for a driver for a first driving session; and
       (b) generates a progress score for the first driving session based upon a comparison between the generated first driving skill score for the driver and a second, past driving skill score for a second, past driving session for the driver; and
   (B) a display device, communicatively connected to the driving-monitor system, that displays a graphic indication to visually indicate a trend, represented by the generated progress score, from the second, past driving skill score to the generated first driving skill score.

2. The driver evaluation system of claim 1, further comprising a first housing for the display device, and a second housing for the driving-monitor system.

3. The driver evaluation system of claim 2, wherein the display device and the driving-monitor system are communicatively connected via a wireless link.

4. The driver evaluation system of claim 2, wherein the first housing is installed in a dash of the vehicle, the first housing configured to house the display device so that a visual output of the display device is observable from within a cabin of the vehicle;
   wherein the display device is (i) communicatively connected to a multimedia system installed in the vehicle, and (ii) configured to receive a display input signal from the multimedia system; and
   wherein the multimedia system receives, from the driving-monitor system, data representing the graphic indication and transmits, to the display device, the data representing the graphic indication.

5. The driver evaluation system of claim 1, wherein the display device and the driving-monitor system share a housing, the display device disposed within, or on, the housing so that a visual output of the display device is observable from outside of the housing.

6. The driver evaluation system of claim 1, wherein a one of the GPS unit or the accelerometer included in the driving-monitor system shares a housing with the driving-monitor system.

7. The driver evaluation system of claim 1, wherein the display device is a touch display, and wherein the display device displays the graphic indication in response to touch input.

8. A computer-implemented method for evaluation progress of a driver's skill level, the method comprising:
   receiving, at a driving-monitor computer system, movement-data detected by a GPS unit or by an accelerometer, the movement-data representing detected movement of a vehicle during a driving session;
   generating, by the driving-monitor computer system and based upon the received movement-data, a first driving skill score for the driving session;
   generating, by the driving-monitor computer system, a progress score for the first driving session based upon a comparison between the generated first driving skill score for a driver and a second, past driving skill score for a second, past driving session for the driver; and
   displaying, by the display device, a graphic indication to visually indicate a trend, represented by the generated progress score, from the second, past driving skill score to the generated first driving skill score.

9. The computer-implemented method of claim 8, wherein displaying the graphic indication comprises displaying a binary indication indicating an improvement or a regression.

10. The computer-implemented method of claim 9, wherein displaying the graphic indication comprises displaying an upward arrow to indicate the improvement or displaying a downward arrow to indicate the regression.

11. The computer-implemented method of claim 8, wherein displaying the graphic indication comprises displaying a percentage indicating a percent improvement or a percent regression.

12. The computer-implemented method of claim 8, wherein displaying the graphic indication comprises displaying a first color when the progress score indicates an improvement, and displaying a second color when the progress score indicates a regression.

13. A driver evaluation system, the driver evaluation system comprising:
- a means for generating movement-data, the movement-data representing detected movement of a vehicle during a driving session;
- a means for generating, based upon the movement-data, a first driving skill score for a driver for the driving session;
- a means for generating a progress score for the driving session based upon a comparison between the generated first driving skill score for the driver and a second, past driving skill score for a second, past driving session for the driver; and
- a means for displaying a graphic indication to visually indicate a trend, represented by the generated progress score, from the second, past driving skill score to the generated first driving skill score.

14. The driver evaluation system of claim 13, wherein the graphic indication is a bar including a first marker and a second marker,
- wherein the first marker is a graphic indication of the generated first driving skill score, and the second marker is a graphic indication of the second, past driving skill score; and
- wherein a distance between the first marker and the second marker represents the trend from the second driving skill score to the generated first driving skill score.

15. The driver evaluation system of claim 13, further including:
- a means to receive user input;
- a means to identify the driver based upon the user input; and
- a means for retrieving, based on the user input, the second, past driving skill score.

16. The driver evaluation system of claim 13, further including:
- a means to receive user input; and
- wherein the means for displaying the graphic indication is configured to display the graphic indication in response to a user input.

17. The driver evaluation system of claim 13, wherein the means for displaying the graphic indication comprises a projector.

18. The driver evaluation system of claim 13, wherein the means for displaying the graphic indication comprises a heads-up display for the vehicle.

* * * * *